(12) United States Patent
Minamitani

(10) Patent No.: US 11,527,796 B2
(45) Date of Patent: *Dec. 13, 2022

(54) PACKAGE FOR POWER STORAGE DEVICE

(71) Applicant: SHOWA DENKO PACKAGING CO., LTD., Isehara-shi, Kanagawa (JP)

(72) Inventor: Koji Minamitani, Isehara (JP)

(73) Assignee: SHOWA DENKO PACKAGING CO., LTD., Kanagawa (JP)

( * ) Notice: Subject to any disclaimer, the term of this patent is extended or adjusted under 35 U.S.C. 154(b) by 507 days.

This patent is subject to a terminal disclaimer.

(21) Appl. No.: 14/986,769

(22) Filed: Jan. 4, 2016

(65) Prior Publication Data

US 2016/0204394 A1   Jul. 14, 2016

(30) Foreign Application Priority Data

Jan. 9, 2015   (JP) .............................. JP2015-002817

(51) Int. Cl.
*H01M 2/02*   (2006.01)
*H01M 2/26*   (2006.01)
(Continued)

(52) U.S. Cl.
CPC ..... *H01M 50/116* (2021.01); *H01M 10/0459* (2013.01); *H01M 50/124* (2021.01);
(Continued)

(58) Field of Classification Search
CPC ............. H01M 2/0285; H01M 2/0287; H01M 10/0459; H01M 2/0215; H01M 2/0267; H01M 2/0275; H01M 2/266; H01G 2/10
See application file for complete search history.

(56) References Cited

U.S. PATENT DOCUMENTS

| | | | |
|---|---|---|---|
| 2001/0051298 A1* | 12/2001 | Hanafusa | H01M 50/10 429/162 |
| 2003/0059673 A1 | 3/2003 | Langan et al. | |
| 2004/0029001 A1* | 2/2004 | Yamazaki | H01M 50/116 429/176 |

(Continued)

FOREIGN PATENT DOCUMENTS

| | | |
|---|---|---|
| CN | 1557029 A | 12/2004 |
| CN | 205752283 U | 11/2016 |

(Continued)

OTHER PUBLICATIONS

Wiktionary: Flange {https://en.wiktionary.org/wiki/flange} Wayback posting evidence Feb. 2, 2001.*

(Continued)

*Primary Examiner* — Olatunji A Godo
(74) *Attorney, Agent, or Firm* — Keating and Bennett, LLP

(57) ABSTRACT

A package for a power storage device includes at least one laminated packaging material having first and second sections. The packaging material includes a metallic foil layer, a heat-resistant resin layer, and a heat-fusible resin layer. In a state in which the heat-fusible resin layers of the first and second sections are faced, peripheral edges thereof are heat-sealed to form a storage chamber for accommodating a device main body. One of the sections is extended outside the storage chamber to form a conductive flange having an exposed heat-fusible resin layer. The conductive flange is provided with an external conductive section in which the heat-fusible resin layer is partially removed to expose the metallic foil layer. The packaging material having the external conductive section is provided with an internal conductive section in the storage chamber in which the heat-fusible resin layer is partially removed to expose the metallic foil layer.

9 Claims, 13 Drawing Sheets

(51) Int. Cl.
    *H01M 10/04* (2006.01)
    *H01M 50/116* (2021.01)
    *H01M 50/54* (2021.01)
    *H01M 50/124* (2021.01)
    *H01M 50/555* (2021.01)
    *H01G 2/10* (2006.01)

(52) U.S. Cl.
    CPC ......... *H01M 50/54* (2021.01); *H01M 50/555* (2021.01); *H01G 2/10* (2013.01)

(56) References Cited

U.S. PATENT DOCUMENTS

| | | | | |
|---|---|---|---|---|
| 2004/0224225 | A1* | 11/2004 | Yamashita | H01M 2/0207 429/181 |
| 2006/0068281 | A1* | 3/2006 | Hiratsuka | H01M 2/1061 429/185 |
| 2010/0290723 | A1 | 11/2010 | Shinozaki et al. | |
| 2013/0236773 | A1 | 9/2013 | Nagata | |
| 2015/0044536 | A1* | 2/2015 | Kwon | H01M 50/10 429/94 |
| 2016/0204394 | A1 | 7/2016 | Minamitani | |

FOREIGN PATENT DOCUMENTS

| | | | | |
|---|---|---|---|---|
| JP | 2001-357825 | * | 12/2001 | ............ H01M 10/05 |
| JP | 2001-357825 A | | 12/2001 | |
| JP | 2013-120730 A | | 6/2013 | |
| JP | 2013-243062 A | | 12/2013 | |
| KR | 20050014426 | * | 2/2005 | .............. H01M 2/30 |
| KR | 101082960 | * | 11/2011 | ............ H01M 10/02 |
| KR | 10-2013-0025354 A | | 3/2013 | |
| WO | 2009/090930 A1 | | 7/2009 | |
| WO | WO 2013/137611 | * | 9/2013 | .............. H01M 2/02 |

OTHER PUBLICATIONS

JP 2001-357825 Dec. 26, 2001 English Machine translation ESPACENET printed Jan. 20, 2019.*

Merriam Webster (periphery definition 3a, {https://www.merriam-webster.com/dictionary/periphery; Apr. 25, 2009}.*

Merriam Webster (periphery definition 3a, {https://www.merriam-webster.com/dictionary/periphery; Apr. 25, 2009 Wayback evidence.*

* cited by examiner

PACKAGE FOR POWER STORAGE DEVICE

CROSS-REFERENCE TO THE RELATED APPLICATIONS

The present application claims priority to Japanese Patent Application No. 2015-2817 filed on Jan. 9, 2015, the entire disclosure of which is incorporated herein by reference in its entirety.

BACKGROUND OF THE INVENTION

Technical Field

The present disclosure relates to a package for a power storage device using a laminated packaging material, and also relates to its related technologies.

Description of the Related Art

The following description of related art sets forth the inventor's knowledge of related art and certain problems therein and should not be construed as an admission of knowledge in the prior art.

In recent years, in accordance with thinning and light-weighting of a mobile device, such as, e.g., a smartphone and a tablet terminal, as a packaging material for a lithium ion secondary battery or a lithium polymer secondary battery to be loaded on such a mobile device, in place of a conventional metallic can, a package made by a laminated material in which a resin film is adhered on both surfaces of a metal foil is used. Further, in a power device, such as, e.g., a large battery, an electric condenser, and a capacitor, used to store electricity for hybrid vehicles, electric vehicles, wind power generation, solar power generation, and night-time electric power, it is being considered to use a laminated packaging material as a material for a package.

In general, although a package made by a laminated packaging material is thinner, lighter, and easier in forming and sealing, and therefore easier in handling in comparison to a metallic can, in cases where the package is used as a package for the aforementioned power storage device, the metal face is never exposed outside. Therefore, the package cannot be used as a conductor like in a dry battery. As a result, as shown in FIG. 10A and FIG. 10B, insulated tab leads are pulled out from the package for wire connection by soldering, etc., and the battery itself is often fixed to a substrate or a housing with an adhesive tape, etc.

In a laminated packaging material, since a metallic foil is used in the center of the layer, if the metallic foil can be exposed by removing the resin layer, there is a possibility that it can be used as a conductor, a soldering section, etc.

As a technology for cutting only a resin layer without cutting a metallic foil of a laminated packaging material, in a packaging bag for packaging a food product or a pharmaceutical tool in a sealed state, there is an easy-to-open packaging bag capable of being opened with one hand by forming a slit in the resin layer by laser processing or mechanical processing using a metal blade (see International Publication No. WO2009/090930, hereinafter referred to as "Patent Document 1").

The Patent Document 1 is directed to a technology for cutting a laminated packaging material in the cross-sectional direction to open a packaging bag, which cannot be applied to expose a metallic foil by removing a resin layer. Even if laser is irradiated onto a resin layer, a linear slit is merely formed and the resin layer will not be removed in a plane shape, which does not cause an exposure of the metallic foil having an area capable of being used for soldering. Further, it is very troublesome to reciprocate laser to burn out the surface of the resin layer so that no resin remains. Therefore, it is difficult to expose the metallic foil of a laminated packaging material in a plane shape to use as a conductor of a power storage device.

The description herein of advantages and disadvantages of various features, embodiments, methods, and apparatus disclosed in other publications is in no way intended to limit the present disclosure. For example, certain features of the preferred described embodiments of the disclosure may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The disclosed embodiments of this disclosure have been developed in view of the above-mentioned and/or other problems in the related art. The disclosed embodiments of this disclosure can significantly improve upon existing methods and/or apparatuses.

The present disclosure was made in view of the aforementioned technical background, and aims to provide a package for a power storage device having a metal exposed section in which a metallic layer is partially exposed in a laminated packaging material constituting the package in a manner such that the metal exposed section can be used as a conductive section, and also aims to provide its related technologies.

The other purposes and advantages of some embodiments of the present disclosure will be made apparent from the following preferred embodiments.

In order to attain the aforementioned objects, the disclosure has the structure as recited in the following Items [1] to [8].

[1] A package for a power storage device includes at least one laminated packaging material having a first section and a second section. The at least one laminated packaging material includes a metallic foil layer having a first surface and a second surface, a heat-resistant resin layer adhered to the first surface of the metallic foil layer, and a heat-fusible resin layer adhered to the second surface of the metallic foil layer. In a state in which the heat-fusible resin layer of the first section of the at least one laminated packaging material and the heat-fusible resin layer of the second section of the at least one laminated packaging material are faced with each other, peripheral edges of the first section and the second section of the at least one laminated packaging material are heat-sealed to form a storage chamber for accommodating a device main body. One of the first section and the second section of the at least one laminated packaging material is extended outside the storage chamber to form a conductive flange in which the heat-fusible resin layer is exposed. The conductive flange is provided with an external conductive section in which at least a part of the heat-fusible resin layer is removed so that the metallic foil layer is exposed. The at least one laminated packaging material having the external conductive section is provided with an internal conductive section in the storage chamber in which a part of the heat-fusible resin layer is removed so that the metallic foil layer is exposed.

[2] The package for a power storage device as recited in the aforementioned Item [1], wherein the at least one laminated packaging material includes two separate laminated packaging materials, wherein the storage chamber is formed by the two separate laminated packaging materials, and wherein at least one of the two separate laminated packaging materials is provided with a conductive flange, an external conductive section, and an internal conductive section.

[3] The package for a power storage device as recited in the aforementioned Item [2], wherein the two separate laminated packaging materials are each provided with the conductive flange, the external conductive section, and the internal conductive section.

[4] The package for a power storage device as recited in the aforementioned Item [3], wherein the conductive flange of the one of the two separate laminated packaging materials and the conductive flange of the other of the two separate laminated packaging materials are formed on different sides of the storage chamber.

[5] The package for a power storage device as recited in the aforementioned Item [1], wherein the at least one laminated packaging material is a single laminated packaging material, and wherein the single laminated packaging material is folded to form the storage chamber.

[6] A power storage device including the package for a power storage device as recited in any one of the aforementioned Items [1] to [5], and a device main body accommodated in the storage chamber of the package, wherein an electrode of the device main body and the internal conductive section of the package are conducted.

[7] The power storage device as recited in the aforementioned Item [6], wherein the electrode of the device main body and the internal conductive section of the package are conducted by any one of physical contact, adhesion, and ultrasonic welding.

[8] A device including the power storage device as recited in the aforementioned Item [6], wherein the external conductive section of the power storage device is in direct contact with and connected to a circuit.

According to the package for a power storage device as recited in the aforementioned Items [1] and [2], since the conductive section to be conducted with the device main body is formed inside and outside the storage chamber as a part of the package, at least a tab lead for one of positive electrode and negative electrode can be eliminated. By eliminating a tab lead, the power storage device can be reduced in weight and size, and the material cost can also be reduced. Further, since the connection space for the power storage device and other devices can be reduced, a device in which the power storage device is loaded can be reduced in weight and size. Further, since the heat-fusible resin layers of the package are directly joined at the heat sealing section without interposing a tab lead, accidents of electrolyte leakage due to a joining defect can be prevented, and a short circuit likely to occur around a tab lead can also be eliminated.

Further, as a method of mounting the power storage device on various devices, like a battery, an easy mounting method in which the power storage device is fitted into a holder can be employed.

Furthermore, since both the external conductive section and the internal conductive section are formed in the heat-fusible resin layer, the work efficiency for producing the laminated package is better as compared to the case in which an external conductive section is formed in a heat-resistant resin layer.

According to the package for a power storage device as recited in the aforementioned Item [3], since two pairs of conductive sections are provided inside and outside the storage chamber of the package, both tab leads for a positive electrode and a negative electrode can be eliminated, exerting the aforementioned effects.

According to the package for a power storage device as recited in the aforementioned Item [4], since a positive electrode and a negative electrode are provided on different sides of the storage chamber and are separated, unintended contact between both positive and negative electrodes can be prevented, making it possible to prevent occurrence of a short circuit accident.

According to the package for a power storage device as recited in the aforementioned Item [5], since one pair of conductive sections are provided inside and outside the storage chamber of the package, one of tab leads for a positive electrode and a negative electrode can be eliminated, exerting the aforementioned effects.

According to the power storage device as recited in the aforementioned Items [6] and [7], since the package as recited in any one of the aforementioned Items [1] to [5] is used, the aforementioned effects are exerted.

According to the device as recited in the aforementioned Item [8], since the power storage device is in direct contact with and connected to a circuit, it can be reduced in size.

BRIEF DESCRIPTION OF THE DRAWINGS

Embodiments of the present disclosure are shown by way of example, and not limitation, in the accompanying figures.

PREFERRED EMBODIMENTS FOR CARRYING OUT THE INVENTION

Figure 1:
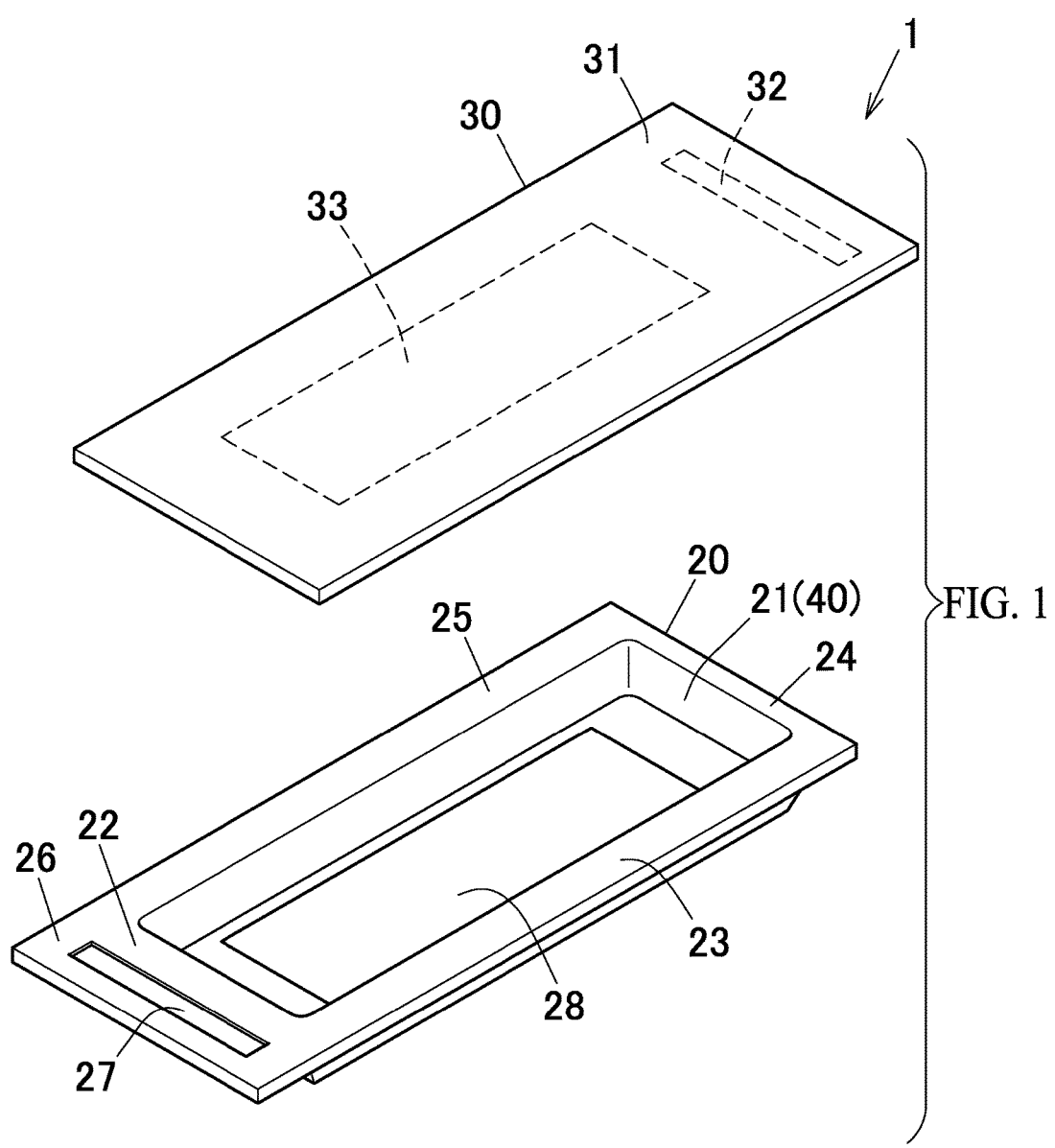
FIG. 1 is a perspective view showing one embodiment of a package for a power storage device according to the present disclosure.
Figure 3:
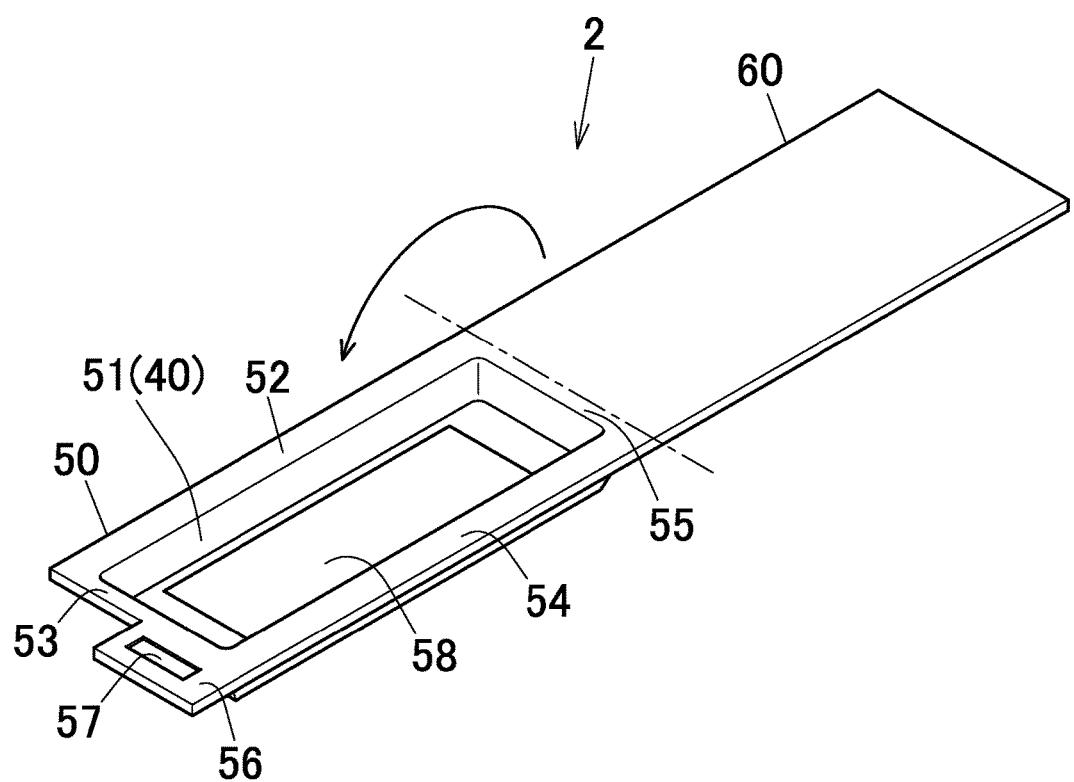
FIG. 3 is a perspective view showing another embodiment of a package for a power storage device according to the present disclosure.
Figure 4:
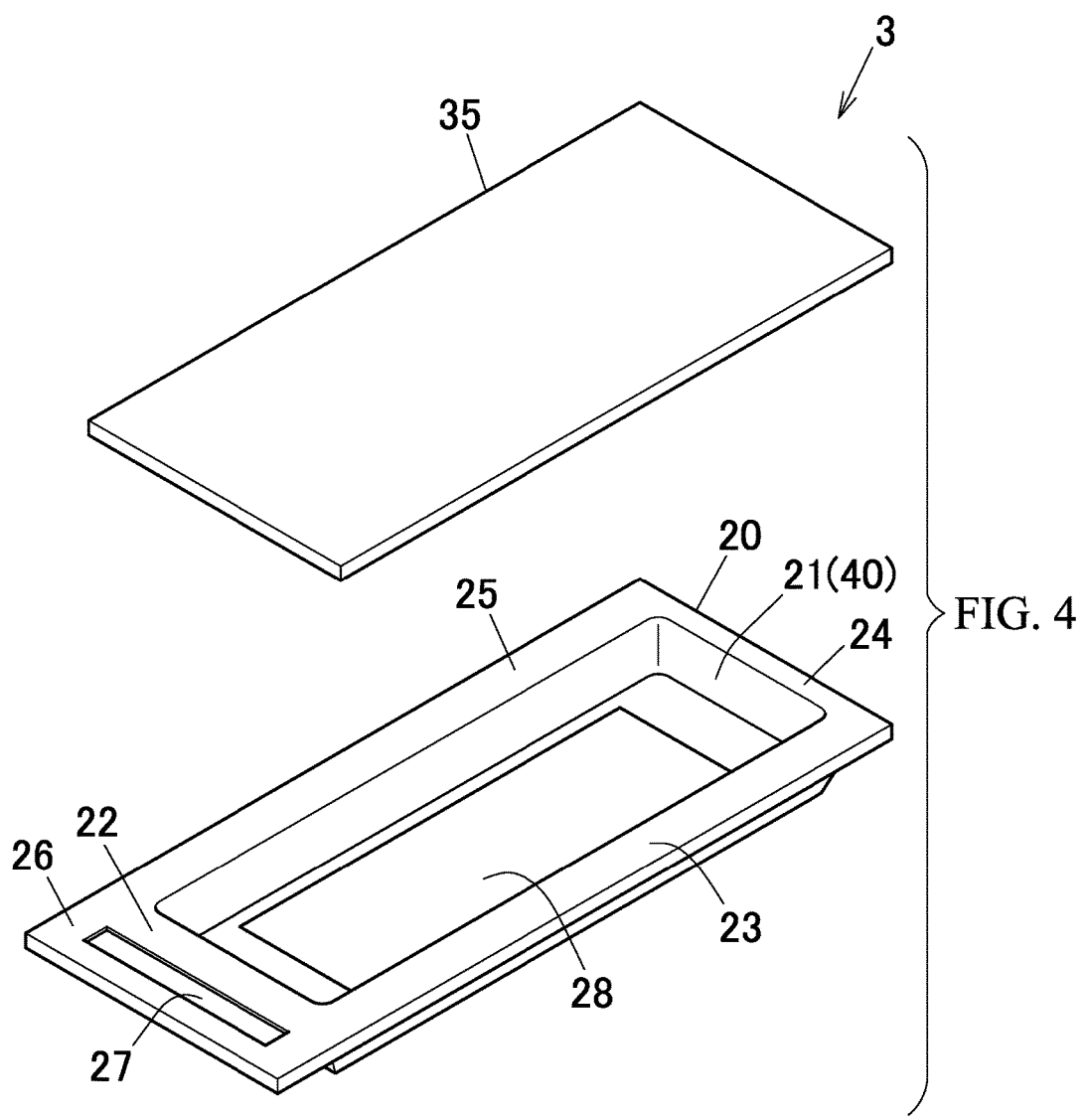
FIG. 4 is a perspective view showing still another embodiment of a package for a power storage device according to the present disclosure.

In the following paragraphs, some embodiments of the present disclosure will be described by way of example and not limitation. It should be understood based on this disclosure that various other modifications can be made by those in the art based on these illustrated embodiments.
[Package for Power Storage Device]
FIGS. 1, 3, and 4 show three embodiments on a package for a power storage device according to the present disclosure.

In the following explanation, the member allotted by the same symbol is the same or equivalent member, and the duplicate explanation will be omitted.
(First Embodiment of Package)
The package 1 shown in FIG. 1 is constituted by a main body 20 (a first section in the present disclosure) in which a laminated packaging material 10 as shown in FIG. 2 is three-dimensionally formed and a cover plate 30 (a second section in the present invention) made of a flat laminated packaging material 10 as shown in FIG. 2.

Figure 2:
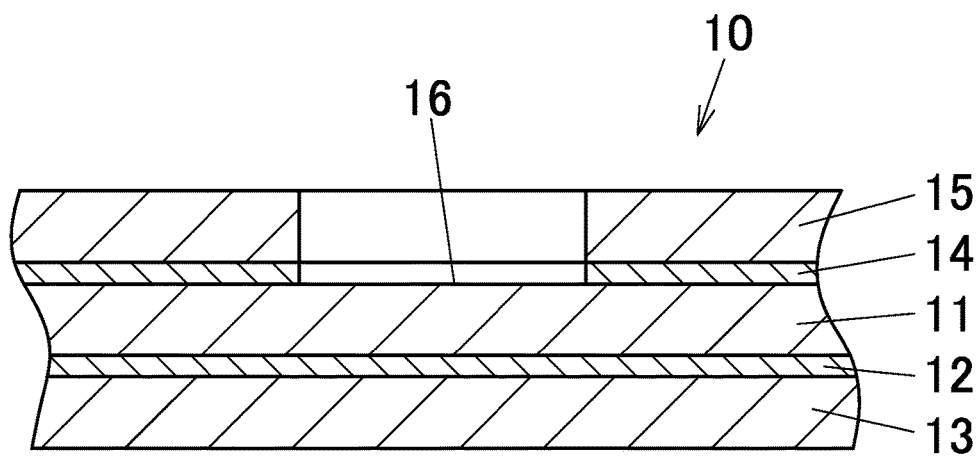
FIG. 2 is an enlarged partial cross-sectional view of a laminated packaging material constituting the package shown in FIG. 1.

As shown in FIG. 2, in the laminated packaging material 10, a heat-resistant resin layer 13 is adhered on one of surfaces (first surface, or the lower surface in FIG. 2) of a metallic foil layer 11 via an adhesive agent 12, and a heat-fusible resin layer 15 is adhered on the other surface (second surface, or the upper surface in FIG. 2) of the metallic foil layer 11 via an adhesive agent 14. Further, the laminated packaging material 10 is provided with a metal exposed section 16 in which there exists no heat-fusible resin layer 15 and no adhesive agent 14 and therefore the metallic foil layer 11 is exposed. The metal exposed section 16 is formed at a required position in the main body 20 and the cover plate 30 of the package 1 and functions as an external conductive section or an internal conductive section according to the position in its assembled state.

The main body 20 is provided with a concave portion 21 three-dimensionally formed by subjecting the laminated packaging material 10 to a process, such as, e.g., bulging and drawing, and flanges 22, 23, 24, and 25 approximately horizontally extending outward from the opening edges of the concave portion 21. One of the flanges (i.e., flange 22) among the four flanges 22, 23, 24, and 25 is formed to be larger in width than the flanges 23, 24, and 25 of the other three sides. On the other hand, the cover plate 30 is a flat sheet made of the laminated packaging material 10 and formed to have the same dimensions as the planar dimensions of the main body 20.

The package 1 is assembled in a manner such that the cover plate 30 covers the opening of the concave portion 21 of the main body 20, and the main body 20 and the cover plate 30 are processed so that the heat-fusible resin layer 15 surfaces face each other. That is, the package 1 is formed so that the heat-fusible resin layers 15 and 15 of the laminated packaging materials 10 and 10 face inward.

The main body 20 and the cover plate 30 have the same planar dimensions, but they are assembled in a manner as to be displaced in the lengthwise direction of the rectangular shape. By this assembly, the concave portion 21 is closed by being covered by the cover plate 30 to form a storage chamber 40, and around the storage chamber 40, the part in which the heat-fusible resin layers 15 of the main body 20 and the cover plate 30 overlap becomes a heat sealing section 41 after loading a bare cell (see FIGS. 7A and 7B). Further, since it is assembled by displacing the main body 20 and the cover plate 30, on both longitudinal ends of the package 1, the main body 20 or the cover plate 30 extends outside the storage chamber 40, forming a portion where the heat-fusible resin layer 15 is exposed. In the present disclosure, the portion in which the heat-fusible resin layer 15 is exposed is used as a conductive flange. In the main body 20, the outer portion of the wide-width flange 22 extends outward of the storage chamber 40 to form a conductive flange 26. In the cover plate 30, the end part of a side opposite to the conductive flange 26 of the main body 20 extends outward of the storage chamber 40 to form a conductive flange 31.

The main body 20 and the cover plate 30 each have two of the aforementioned metal exposed sections 16 of the laminated packaging material 10. The main body 20 has a metal exposed section on the conductive flange 26 and a metal exposed section on a bottom surface of the concave portion 21, and the metal exposed section of the conductive flange 26 is an external conductive section 27 exposed outside the storage chamber 40 and the metal exposed section on the bottom surface of the concave portion 21 is an internal conductive section 28 exposed inside the storage chamber 40. The cover plate 30 is provided with a metal exposed section formed at the conductive flange 31 and a metal exposed section formed at a part closing/covering the concave portion 21 of the main body 20. The metal exposed section of the conductive flange 31 is an external conductive section 32 exposed outside the storage chamber 40, and the metal exposed section closing/covering the concave portion 21 is an internal conductive section 33 exposed inside the storage chamber 40. That is, the package 1 is provided with two pairs of conductive sections conducting the inside and the outside of the storage chamber 40 via the metallic foil layer 11, and the two pairs of conductive sections are insulated mutually.
(Second Embodiment of Package)
In a package 2 shown in FIG. 3, a main body 50 ("first section" in this invention) having a concave portion 51 rectangle in plan view and a cover plate 60 ("second section" in this invention) covering/closing the concave portion 51 are integrally formed by a single piece of a laminated packaging material 10 as shown in FIG. 2. The main body 50 is provided with flanges 52, 53, 54 and 55 extending from four sides of the opening edge of the concave portion 51, and is formed by performing a folding operation so that the main body 50 and the cover plate 60 face with each other. Thus, the concave portion 51 is closed/covered by the cover plate 60 to form a storage chamber 40. Further, the flange 53 located at the opposite side of a folding line of the laminated packaging material 10 among the four flanges 52, 53, 54, and 55 is partially outwardly protruded from the folded cover plate 60 and forms a conductive flange 56 in which the heat-fusible resin layer 15 is exposed. Further, the sections where the heat-fusible resin layers 15 of three side sections surrounding the storage chamber 40 become heat-sealing sections 41 after loading a bare cell.

The metal exposed section 16 of the laminated packaging material 10 is formed at a total of two portions, i.e., one at the conductive flange 56 and the other at the bottom surface of the concave portion 51. The metal exposed section formed at the conductive flange 56 functions as an external conductive section 57 exposed outside the storage chamber 40, and the metal exposed section formed at the bottom surface of the concave portion 51 functions as an internal conductive section 58 exposed inside the storage chamber 40. That is, the package 2 is provided with one pair of conductive sections conducting the inside and the outside of the storage chamber 40.

(Third Embodiment of Package)

In a package for a power storage device formed by two separate members, it is possible to form an external conductive section and an internal conductive section only on one of the members, and a laminated packaging material having no metal exposed section can be used for the other member. In the package 3 shown in FIG. 4, the main body 20 of the package 1 shown in FIG. 1 and a cover plate 35 made of a laminated packaging material having no metal exposed section are combined. The cover plate 35 is formed to have the planner dimensions as those of the main body 20 except for the conductive flange 26, and therefore when the cover plate 35 covers the main body 20, the conductive flange 22 is exposed outside the storage chamber 40. That is, the package 3 is provided with one pair of conductive sections conducting the inside and the outside of the storage chamber 40.

The packages 1, 2, and 3 for a power storage device are examples in which external conductive sections 27, 32, and 57 are formed at a part of the conductive flanges 26, 31, and 56, but the metallic foil layer can be exposed on the entire region of the conductive flange to form an external conductive section.

(Structural Material of Laminated Packaging Material)

The material of each layer constituting the laminated packaging material 10 can be any material as long as it can be used as a packaging material of a power storage device. The preferable materials are as follows.

(Heat-Resistant Resin Layer)

As a heat-resistant resin constituting the heat-resistant resin layer 13 which becomes an outer layer of the package, a heat-resistant resin that does not melt at a heat sealing temperature when heat-sealing the packaging material is used. As the heat-resistant resin, it is preferable to use a heat-resistant resin having a melting point higher than the melting point of the heat-fusible resin constituting the heat-fusible resin layer 15 by 10° C. or more, and it is especially preferable to use a heat-resistant resin having a melting point higher than the melting point of the heat-fusible resin by 20° C. or more.

As the heat-resistant resin layer 13, for example, although not especially limited to, a polyamide film, a polyester film, etc., can be exemplified, and these oriented films are preferably used. Among them, from the viewpoint of formability and strength, a biaxially oriented polyamide film or a biaxially oriented polyester film, or a multi-layer film including the biaxially oriented polyamide film or the biaxially oriented polyester film is especially preferable. Further, it is preferable to use a multi-layer film in which a biaxially oriented polyamide film and a biaxially oriented polyester film are adhered together. The polyamide film is not especially limited, but for example, a polyamide 6 film, a polyamide 6, 6 film, an MXD polyamide film, etc., can be exemplified. Further, as a biaxially oriented polyester film, a biaxially oriented polybutylene terephthalate (PBT) film, a biaxially oriented polyethylene terephthalate (PET) film, etc., can be exemplified. Further, the heat-resistant resin layer 13 can be formed by a single layer or a multi-layer made of, for example, a PET film/polyamide film.

Further, it is also preferable to blend lubricant and/or solid fine particles to improve the slidability of the surface of the heat-resistant resin layer 13 to thereby improve the slidability with respect to a molding die.

It is preferable that the thickness of the heat-resistant resin layer 13 is 9 μm to 50 μm. By setting the thickness of the heat-resistant resin layer 13 to 9 μm or more, sufficient strength can be secured as a package for a power storage device. By setting it to 50 μm or less, the stress at the time of three-dimensional forming can be decreased, which in turn can improve the formability. The especially preferable thickness of the heat-resistant resin layer 13 is 10 μm to 30 μm.

(Heat-Fusible Resin Layer)

The heat-fusible resin layer 15 which is an inner layer has an excellent chemical resistance against strong corrosive electrolyte used for lithium ion secondary batteries, etc., and exerts a role of applying heat sealing properties to the package.

As the heat-fusible resin layer 15, it is not specifically limited, but in terms of chemical resistance and heat sealing properties, it is preferably constituted by polyethylene, polypropylene, olefin-based copolymer, and their acid modifications and ionomers. Further, as an olefin-based copolymer, EVA (ethylene-vinyl acetate copolymer), EAA (ethylene-acrylic acid copolymer), and EMMA (ethylene-methacrylic acid copolymer) can be exemplified. Further, a polyamide film (e.g., nylon 12) or a polyimide film can also be used.

As to the heat-fusible resin layer 15, similarly to the heat-resistant resin layer 13, it is preferable to blend lubricant and/or solid fine particles to improve the slidability of the surface.

The thickness of the heat-fusible resin layer 15 is preferably set to 20 μm to 80 μm. By setting the thickness to 20 μm or more, generation of pinholes can be sufficiently prevented, and by setting the thickness to 80 μm or less, the amount of resin used can be reduced, thereby making it possible to reduce the cost. Among them, it is especially preferable that the thickness of the heat-fusible resin layer 15 is set to 20 μm to 50 μm. Further, the heat-fusible resin layer 15 can be a single layer or a multi-layer. As a multi-layer film, a three-layer film in which a polypropylene random copolymer film is laminated on both surfaces of a polypropylene block copolymer film can be exemplified.

(Metallic Foil Layer)

The metallic foil layer 11 plays a role of giving gas barrier characteristics for preventing invasion of oxygen and/or moisture into the laminated packaging material 10. Further, in the present disclosure, since the metal exposed section is used as a conductive section, a metallic foil with good conductivity is used. For example, an aluminum foil, a copper foil, a nickel foil, a stainless steel foil, a clad foil thereof, an annealed foil thereof, an un-annealed foil thereof, etc., can be exemplified. Further, it is also preferable to use a metallic foil plated with a conductive metal, such as, e.g., nickel, tin, copper, and chromium, such as, e.g., a plated aluminum foil. The conductive plated film may be formed at a portion corresponding to at least the metal exposed section of the metallic foil layer. Further, it is preferable that the metallic foil layer 11 is subjected to the following chemical conversion treatment as a substrate treatment to form a chemical conversion film.

(Chemical Conversion Film of Metallic Foil Layer)

The outer layer and the inner layer of the laminated packaging material 10 are layers made of resin. For these resin layers, although a minute amount, light, oxygen, and liquid may enter from outside the package and the contents (electrolyte of batteries, etc.) may soak from the inside. Further, there is a risk that the contents may adhere to the internal conductive section of the package. When reaching the metallic foil layer 11, these intruded objects and/or contents cause corrosion of the metallic foil layer 11. In the laminated packaging material 10 of the present disclosure, by forming a chemical conversion film high in corrosion resistance on the surface of the metallic foil layer 11, the corrosion resistance of the metallic foil layer 11 can be improved.

The chemical conversion film is a film formed by subjecting the metallic foil surface to a chemical conversion treatment, and can be formed, for example, by subjecting the metallic foil to a chromate treatment or a non-chromium type chemical conversion treatment using a zirconium compound. For example, in the case of a chromate treatment, after applying a solution of any one of the following mixtures 1) to 3) to the surface of the metallic foil to which a degreasing treatment was subjected, it is dried.
1) A mixture of phosphoric acid, chromic acid and at least one of metal salt of fluoride and non-metal salt of fluoride
2) A mixture of phosphoric acid, any one of acrylic rein, a chitosan derivative resin and a phenolic resin, and at least one of chromic acid and chromium (III) salt
3) A mixture of phosphoric acid, any one of acrylic resin, chitosan derivative resin and phenolic resin, at least one of chromic acid and chromium (III) salt, and at least one of metal salt of fluoride and non-metallic salt of fluoride For the chemical conversion film, it is preferable that the chromium adhesion amount is 0.1 mg/m$^2$ to 50 mg/m$^2$, more preferably 2 mg/m$^2$ to 20 mg/m$^2$. By the chemical conversion film having the thickness or the chromium adhesion amount, a laminated packaging material having high corrosion resistance can be obtained.

Further, a laminated packaging material having a chemical conversion film on one of surfaces of the metallic foil layer 11 is included in the present disclosure.

The thickness of the metallic foil layer 11 is preferably 20 μm to 200 μm. By setting the thickness to 20 μm or more, generation of pinholes or breakages at the time of rolling and heat-sealing when producing a metallic foil can be prevented. By setting the thickness to 200 μm or less, the stress at the time of bulging or drawing can be decreased to thereby improve the formability. Further, by setting the thickness of the metallic foil layer 11 to 200 μm or less, the increase in weight and cost of materials can be controlled.

(Adhesive Agent)

As the adhesive agent 12 on the heat-resistant resin layer 13 side, for example, an adhesive agent including a two-part curing type polyester-urethane-based resin including a polyester resin as a base resin and a polyfunctional isocyanate compound as a curing agent, or a polyether-urethane-based resin is preferably used.

On the other hand, as the adhesive agent 14 on the heat-fusible resin layer 15 side, for example, a polyurethane-based adhesive agent, an acrylic adhesive agent, an epoxy adhesive agent, a polyolefin-based adhesive agent, an elastomeric adhesive agent, a fluorine-based adhesive agent, etc., can be exemplified. Among them, it is preferable to use an acrylic adhesive agent or a polyolefin-based adhesive agent, and in such a case, the resistance to electrolyte and moisture barrier characteristics of the laminated packaging material 10 can be improved. Further, in the case of using the laminated packaging material for a battery case, it is preferable to use an adhesive agent, such as, e.g., an acid-modified polypropylene and polyethylene.

Further, the total thickness of the laminated packaging material 10 is preferably in the range of 50 μm to 300 μm. When the total thickness is less than 50 μm, breakages or pinholes are easily generated at the time of forming and heat-sealing. Further, when the total thickness exceeds 300 μm, the moldability may deteriorate. When the laminated packaging material becomes thick, the material cost increases and the weight also increases.

(Method of Forming Metal Exposed Section)

The method of forming the metal exposed section 16 of the laminated packaging material 10 is not especially limited. However, since the metal exposed section 16 is a connecting place for conducting the device main body or another device, it is preferable that the metallic foil layer 11 is exposed in a planar shape to assuredly obtain conduction. Hereinafter, an example of a method for exposing the metallic foil layer 11 in a planar shape will be explained.

(1) With a known method, the heat-resistant resin layer 13 is adhered on one of surfaces of the metallic foil layer 11 with the adhesive agent 12, and the heat-fusible resin layer 15 is adhered on the other surface with the adhesive agent 14 to manufacture a five-layer structure laminated packaging material. A laser is irradiated on the heat-fusible resin layer 15 side surface of the laminated packaging material 10 to cauterize and remove the heat-fusible resin layer 15 and the adhesive agent 14 to expose the metallic foil layer 11.

Figure 5:
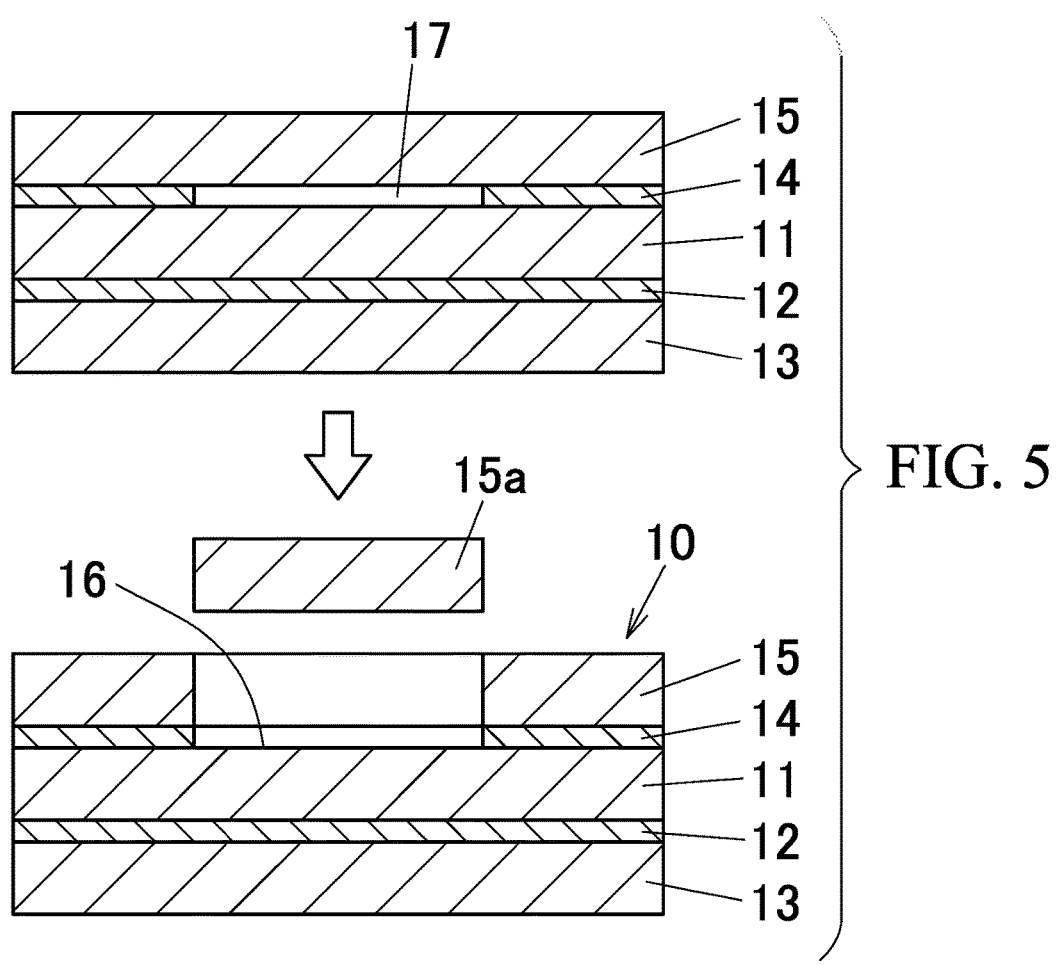
FIG. 5 is a cross-sectional view showing a method of forming a metal exposed section of a laminated packaging material.

(2) As shown in FIG. 5, in the step of adhering the metallic foil layer 11 and the heat-fusible resin layer 15, an unapplied portion 17 in which the adhesive agent 14 is not applied is formed at a portion corresponding to the metal exposed section 16, and the heat-fusible resin layer 15 is adhered. Then, a slit is formed in the heat-fusible resin layer 15 around the unapplied portion 17 to remove the heat-fusible resin layer 15a above the unapplied portion 17. Since the adhesive agent 14 is not applied at the unapplied portion 17, the metallic foil layer 11 is exposed by the removal of the heat-fusible resin layer 15a. Thus, the metal exposed section 16 is formed.

In the aforementioned method, to make it easy to discriminate the unapplied portion 17, a pigment or a coloring agent can be added to the adhesive agent 14.

The metallic foil layer 11 and the heat-resistant resin layer 13 are adhered together with a known method using the adhesive agent 12.

Figure 6:
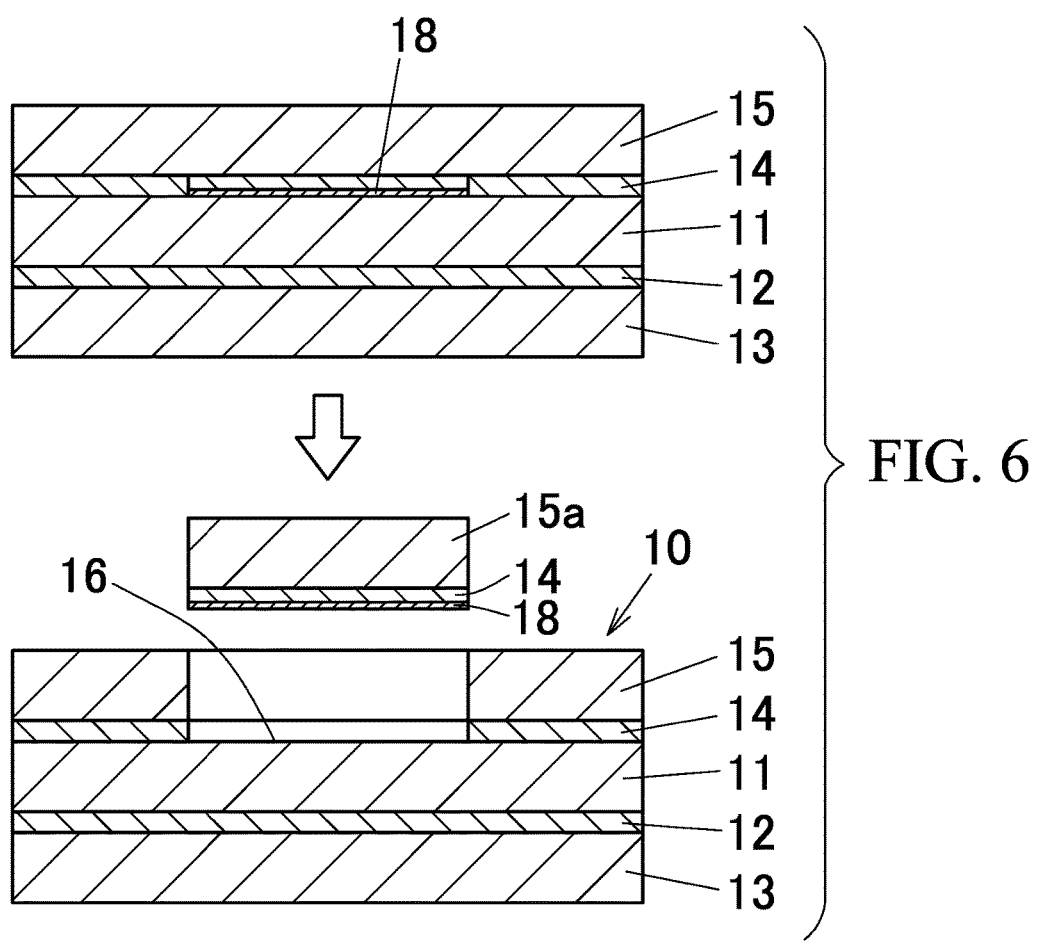
FIG. 6 is a cross-sectional view showing another method of forming a metal exposed section of a laminated packaging material.

(3) As shown in FIG. 6, in the step of adhering the metallic foil layer 11 and the heat-fusible resin layer 15, an adhesive tape 18 is adhered on a portion corresponding to the metal exposed section 16, and an adhesive agent 14 is applied afterwards to adhere the heat-fusible resin layer 15. Then, a slit is formed in the heat-fusible resin layer 15 around the adhesive tape 18 to remove the heat-fusible resin layer 15a. Since the adhesive tape 18 and the heat-fusible resin layer 15 are joined by the adhesive agent 14, the adhesive tape 18 is removed together with the heat-fusible resin layer 15a. When the heat-fusible resin layer 15a and the adhesive tape 18 are removed, the metallic foil layer 11 is exposed. Thus, the metal exposed section 16 is formed. The slit in the heat-fusible resin layer 15 is formed by laser irradiation, cutting using a cutter, etc.

In place of adhering the adhesive tape 18, an adhesion inhibitor may be applied to the metallic foil layer 11.

The metallic foil layer 11 and the heat-resistant resin layer 13 are adhered together with a known method using the adhesive agent 12.

When three-dimensionally forming the laminated packaging material 10, it is three-dimensionally formed after forming the metal exposed section 16 at a required position using the aforementioned method and then trimmed into required dimensions after the three-dimensional forming.

(Power Storage Device)

FIGS. 7A to 9B show laminate-packaged batteries 101, 102, and 103 using the aforementioned package 1, 2, and 3.

The bare cell 70 is common to the laminate-packaged batteries 101, 102, and 103, and it is a laminated body that is laminated in a multi-layer in a state in which a separator 73 is interposed between a negative electrode 71 and a positive electrode 72.

In the following explanation, the members having the same symbols are the same or equivalent members, and duplicate explanations are omitted. Further, FIGS. 7B, 8B, 8C, and 9B only show the metallic foil layer 11, the heat-resistant resin layer 13, and the heat-fusible resin layer 15 of the laminated packaging material 10 constituting the packages 1, 2 and 3, and the illustrations of the adhesive agents 12 and 14 are not illustrated.

The laminate-packaged batteries 101, 102, and 103 correspond to a power storage device of the present disclosure and the bare cell corresponds to a device main body of the present disclosure.

(First Laminate-packaged Battery)

Figure 7A:
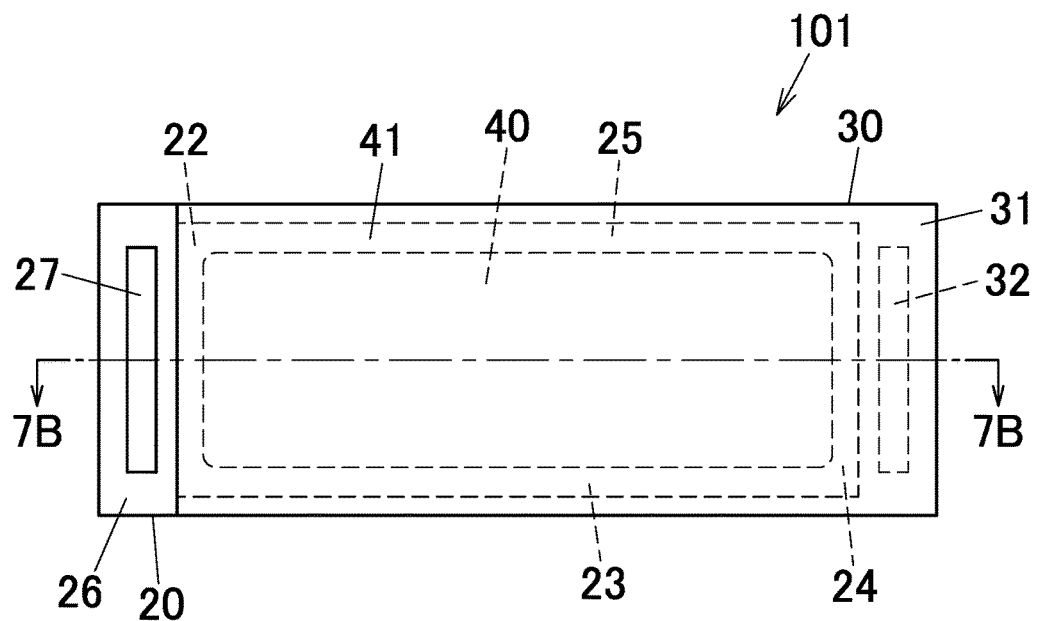
FIG. 7A is a plan view of a laminate-packaged battery using the package shown in FIG. 1.
Figure 7B:
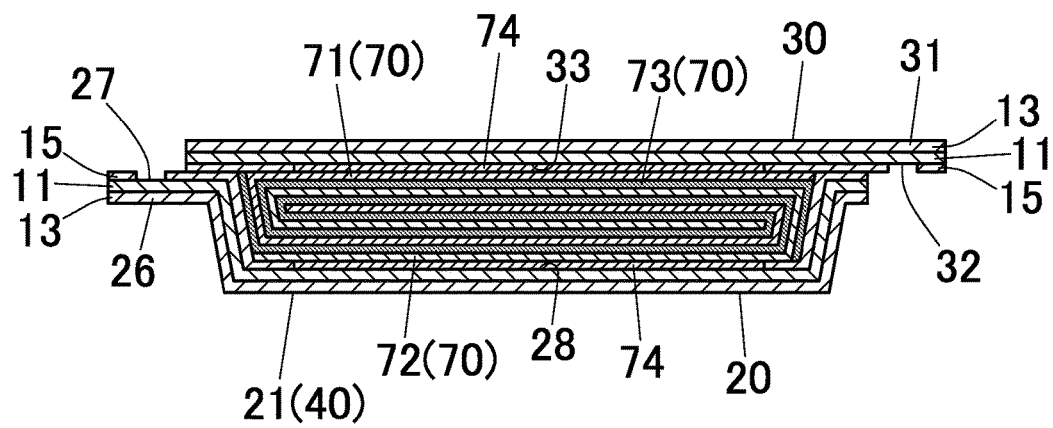
FIG. 7B is a cross-sectional view taken along the line 7B-7B of FIG. 7A.

FIGS. 7A and 7B show a first laminate-packaged battery 101 in which a bare cell 70 is loaded in the package 1 shown in FIG. 1.

In the bare cell 70, a positive electrode 72 is exposed to the bottom surface and a negative electrode 71 is exposed to the top surface.

The laminate-packaged battery 101 is produced by loading the bare cell 70 in the storage chamber 40 of the package 1 in the step of assembling the package 1. The details are as follows.

(1) The positive electrode 72 exposed to the bottom surface of the bare cell 70 is conducted with the internal conductive section 28 in the concave portion 21 of the main body 20. On the other hand, the negative electrode 71 exposed to the top surface of the bare cell 70 is conducted with the internal conductive section 33 of the cover plate 30. The method of conduction is not limited. Conduction can be obtained by physically contacting the internal conductive section 28 and 33 with the positive electrode 72 or the negative electrode 71, but they can be joined by adhesion with a conductive adhesive agent, ultrasonic bonding, etc. FIG. 7B shows an example of adhesion with a conductive adhesive agent 74. When adhesion or joining is used for conduction, since the positive electrode 72 or the negative electrode 71 will not inadvertently detach from the internal conductive sections 28 and 33 during assembly, workability improves. Further, by adhering or joining, a stable conductive state can be maintained after assembly.

(2) The bare cell 70 is loaded in the concave portion 21 of the main body 20 and covered by the cover plate 30.

(3) Among the flanges 22, 23, 24 and 25 on the four sides around the concave portion 21, three sides are heat-sealed, and electrolyte is injected into the storage chamber 40 from the unsealed side. At this time, it is preferable to remain the sides not having the conductive flanges 26 and 31 unsealed and inject electrolyte from a side not having the external conductive section 27 and 32. In this case, the risk of adhesion of the electrolyte to the external conductive sections 27 and 32 can be reduced at the time of the injecting operation.

(4) The flanges on the unsealed sides are heat-sealed. With this, the heat-sealed section 41 is formed on the entire periphery of the storage chamber 40, and the bare cell 70 and the electrolyte are sealed inside the storage chamber 40.

In the first laminate-packaged battery 101, the positive electrode 72 of the bare cell 70 is conducted with the internal conductive section 28 of the main body 20 of the package 1 and conducted with the external conductive section 27 with the metallic foil layer 11 of the laminated packaging material 10 constituting the main body 20 as a conductor. Further, the negative electrode 71 of the bare cell 70 is conducted with the internal conductive section 33 of the cover plate 30 of the package 1 and conducted with the external conductive section 32 with the metallic foil layer 11 of the laminated packaging material 10 constituting the cover plate 30 as a conductor. With this structure, the laminate-packaged battery 101 can be charged/discharged via the external conductive sections 27 and 32 of the package 1.

(Second Laminate-packaged Battery)

Figure 8A:
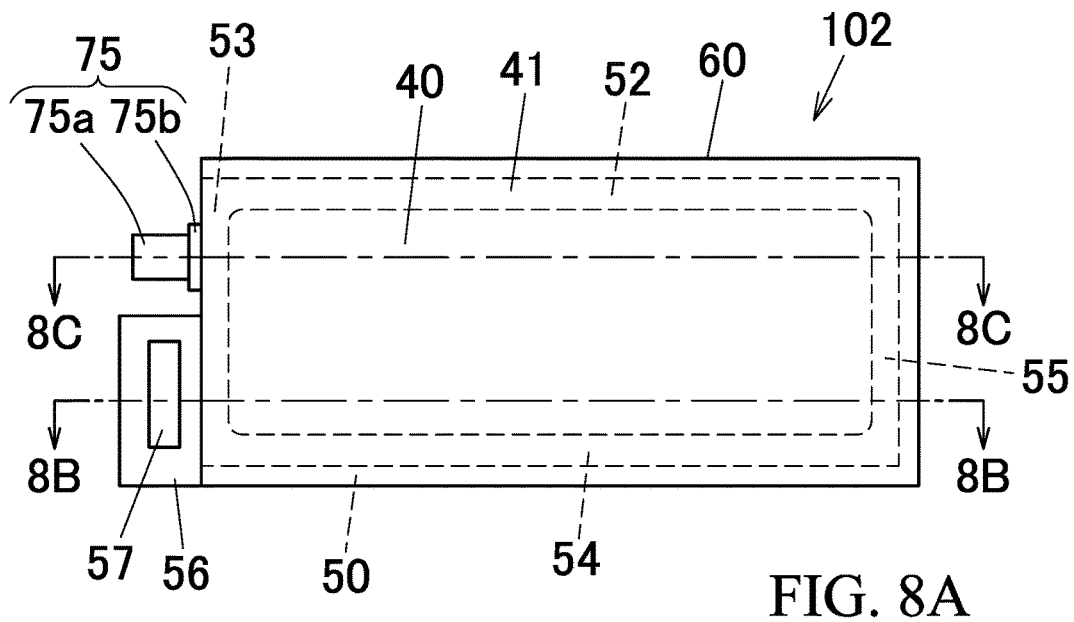
FIG. 8A is a plan view of a laminate-packaged battery using the package of FIG. 3.
Figure 8B:
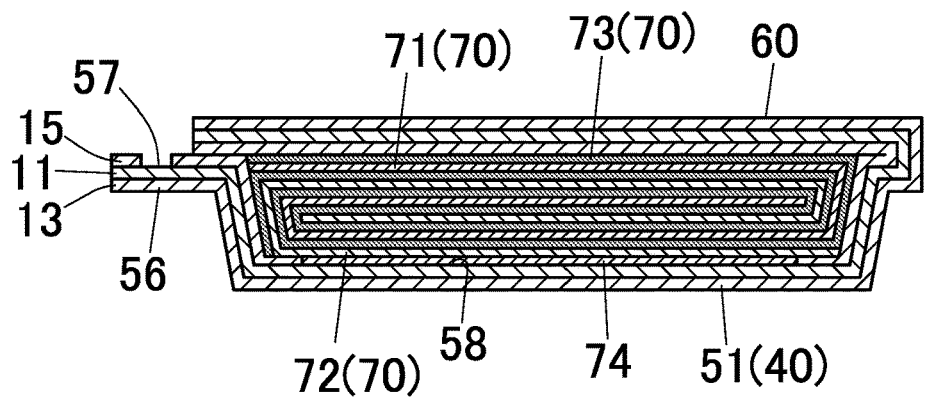
FIG. 8B is a cross-sectional view taken along the line 8B-8B of FIG. 8A.
Figure 8C:
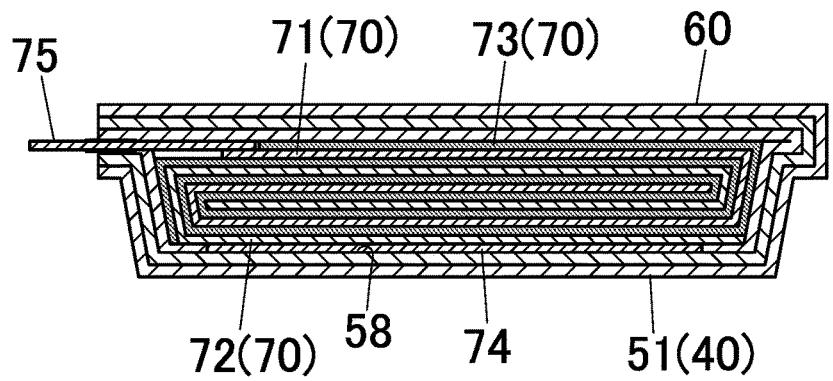
FIG. 8C is a cross-sectional view taken along the line 8C-8C of FIG. 8A.

FIGS. 8A to 8C show a second laminate-packaged battery 102 in which a bare cell 70 is loaded in the package 2 shown in FIG. 3.

The package 2 is constituted by one piece of the laminated packaging material 10, and there is one pair of conductive sections conducting the inside and the outside of the storage chamber 40. Thus, a tab lead is connected to one of the negative electrode 71 and the positive electrode 72 of the bare cell 70 and pulled out from the package 2 to obtain a conducting path. In the illustrated example, the positive electrode 72 of the bare cell 70 is adhered to the internal conductive section 58 by the conductive adhesive agent 74. On the other hand, a negative electrode tab lead 75 is connected to the negative electrode 71. The aforementioned reference numeral "75*a*" denotes a metal plate, and the reference numeral "75*b*" denotes a resin film interposed at the heat-sealed section 41.

The assembly procedure for the second laminate-packaged battery 102 is as follows.

(1) The negative electrode tab lead 75 is connected to the negative electrode 71 of the bare cell 70. The connection method is not specifically limited, but can be performed by ultrasonic bonding, etc.

(2) The positive electrode 72 exposed to the lower surface of the bare cell 70 is conducted with the internal conductive section 58 of the concave portion 51 of the main body 50 of the package 2. FIG. 8B shows an adhering example by the conductive adhesive agent 74.

(3) The bare cell 70 is loaded in the concave portion 51 so that the negative electrode tab lead 75 is pulled out from the flange 53, and the cover plate 60 is covered.

(4) Three sides among four flanges around the concave portion 51 is heat-sealed, and electrolyte is injected in the storage chamber 40 from the unsealed side. At this time, it is preferable that the unsealed side is a flange 52 or flange 54 not having the external conductive section 57 and the negative electrode tab lead 75. This can reduce the risk of adhesion of the electrolyte to the external conductive section 57 or the negative electrode tab lead 75 at the time of the injection operation.

(5) The flanges of the unsealed sides are heat-sealed. With this, a heat-sealed section 41 is formed around the entire periphery of the storage chamber 40, so that the bare cell 70 and the electrolyte are sealed in the storage chamber 40.

In the second laminate-packaged battery 102, the positive electrode 72 of the bare cell 70 is conducted with the internal conduction section 58 of the package 2, and the metallic foil layer 11 of the laminated packaging material 10 constituting the package 2 is conducted with the external conductive section 57 as a conductor. Further, the negative electrode 71 of the bare cell 70 is conducted with the outside of the package 2 via the negative electrode tab lead 75. Since the package 2 is formed by a single piece of the laminated packaging material 10, it is required to use a tab lead for one of electrodes. As compared with the aforementioned first laminate-packaged battery 101, effects of reducing the size and the weight and effects of reducing the connection space to another device are small, but a certain effect can be obtained. Further, since the package 2 is formed by a single piece of the laminated packaging material 10, the assembling operation can be performed easily.

(Third Laminated-packaged Battery)

Figure 9A:
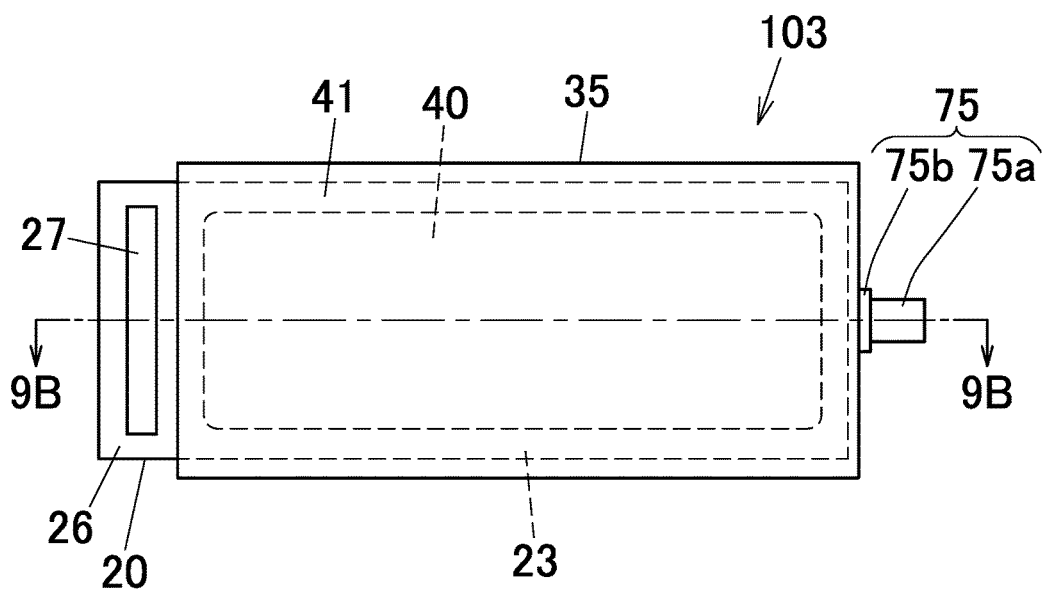
FIG. 9A is a plan view of a laminate-packaged battery using the package shown in FIG. 4.
Figure 9B:
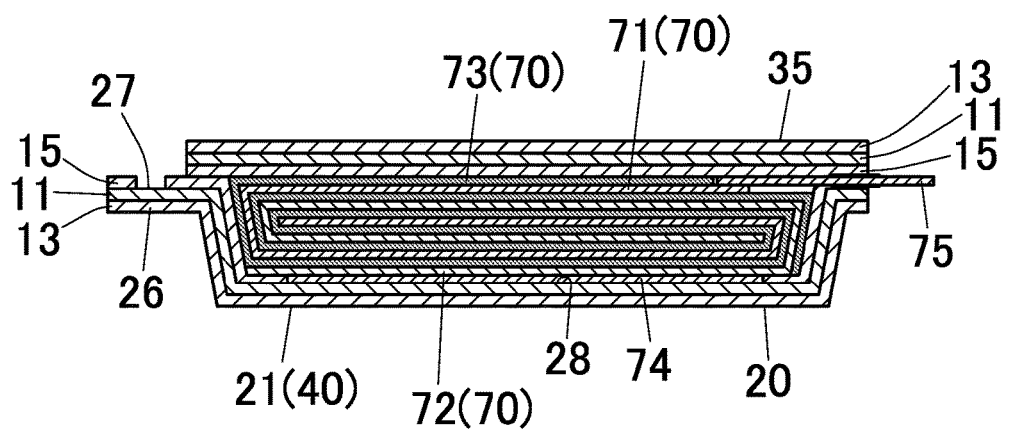
FIG. 9B is a cross-sectional view taken along the line 9B-9B of FIG. 9A.

FIG. 9A and FIG. 9B show a third laminate-packaged battery 103 in which a bare cell 70 is loaded in the package 3 shown in FIG. 4.

Since the package 3 is provided with one pair of conductive sections conducted with the inner side and the outer side of the storage chamber 40, one of the negative electrode 71 and the positive electrode 72 of the bare cell 70 is connected to a tab lead to be pulled out from the package 3. In the illustrated example, the positive electrode 72 of the bare cell 70 is adhered to the internal conductive section 28 by the conductive adhesive agent 74. On the other hand, the negative electrode tab lead 75 is connected to the negative electrode 71.

The fabrication procedure of the third laminate-packaged battery 103 is as follows.

(1) The tab lead 75 is connected to the negative electrode 71 of the bare cell 70.

(2) The positive electrode 72 exposed to the lower surface of the bare cell 70 is conducted with the internal conductive section 28 of the concave portion 21 of the main body 20 of the package 3.

(3) The bare cell 70 is loaded in the concave portion 21 of the main body 20 so that the negative electrode tab lead 75 is pulled out from the flange 24 opposing to the conductive flange 26, and the cover plate 35 is covered.

The cover plate 35 is covered so that the end portion of the cover plate 35 and the end portion of the flange 24 are aligned at the side where the negative electrode tab lead 75 is pulled out and the conductive flange 26 is exposed.

(4) Three sides among four flanges 22, 23, 24 and 25 around the concave portion 21 are heat-sealed, and electrolyte is injected in the storage chamber 40 from the unsealed side. At this time, it is preferable to remain the sides not having the conductive flange 26 and the negative electrode tab lead 75 as non-sealed sides and inject electrolyte from the side not having the external conductive section 27 and the negative electrode tab lead 75.

(5) The flanges of the non-sealed sides are heat-sealed. With this, a heat-sealed section 41 is formed around the entire periphery of the storage chamber 40, so that the bare cell 70 and the electrolyte are sealed in the storage chamber 40.

In the third laminate-packaged battery 103, the positive electrode 72 of the bare cell 70 is conducted with the internal conduction section 28 of the main body 20, and the metallic foil layer 11 of the laminated packaging material 10 constituting the main body 20 is conducted with the external conductive section 27 as a conductor. Further, the negative electrode 71 of the bare cell 70 is conducted with the outside of the package 3 via the negative electrode tab lead 75.

As explained above, in the power storage device according to the present disclosure, since the conductive section connected to the device main body is formed outside and inside the storage chamber as a part of the package, a tab lead can be eliminated. By providing at least one pair of conductive sections on the package, at least one of tab leads of the positive electrode and the negative electrode can be eliminated. By eliminating the tab lead, the weight and size of the power storage device can be reduced, and further the material costs can also be reduced. Further, since the connection space for the power storage device and other devices can also be reduced, a device mounting the power storage device can also be reduced in weight and size.

Further, since there exists no tab lead in the heat-sealed section and the heat-fusible resin layers of the package are directly joined, it becomes possible to prevent occurrence of electrolyte leakage due to bonding defects. Further, it also becomes possible to prevent occurrence of short circuit which easily occurs near the tab lead.

Further, as a mounting method of the power storage device to various devices, like a dry-cell battery, it can be possible to employ an easy mounting method of fitting the power storage device in a holder. Further, it is possible to directly connect the conductive section to a circuit of various electronic apparatuses, and by integrally connecting the conductive section to the circuit, the electronic apparatus can be reduced in size.

Further, since the external conductive section and the internal conductive section are each formed in the heat-fusible resin layer, as compared with the case in which the inner and outer conductive sections are formed at the heat-resistant resin layer and the heat-fusible resin layer, the production of the laminated packaging material can be improved in work efficiency.

Further, since there exists no tab lead in the heat-sealed section and that the heat-fusible resin layers of the package are directly joined, it becomes possible to prevent occurrence of electrolyte leakage due to bonding defects.

In the case in which two pairs of conductive sections are formed in the package, it is preferable to form the two pairs of conductive sections at different sides of the storage chamber and position the positive electrode and the negative electrode at separate positions. The first laminate-packaged battery 101 shown in FIG. 7A is an example in which the external conductive sections 27 and 32 are provided at opposed sides of the storage chamber 40. Further, external conductive sections can be provided at adjacent sides of the storage chamber. By providing two external conductive sections at different sides of the storage chamber, unintentional contact of the positive electrode and the negative electrode can be prevented, which in turn can prevent occurrence of a short circuit problem. It should be noted that the present disclosure does not exclude a package in which two external conductive sections are formed at the same side of the storage chamber.

Whether or not the package is formed three-dimensionally and whether or not the concave portion as shown in the aforementioned embodiments is formed can be arbitrarily selected. Since the capacity of the storage chamber can be increased by forming the concave portion in the package, the package in which the concave portion is formed is suitable for middle to high capacity batteries using a bare cell large in the lamination number. On the other hand, a bag-shaped package in which the edge portion is heat-sealed without forming a concave portion is suitable for low capacity batteries.

The power storage device of the present disclosure is not limited to a battery. For example, it can be applied to other devices other than batteries, such as, e.g., capacitors and electronic condensers.

EXAMPLES

Figure 10A:
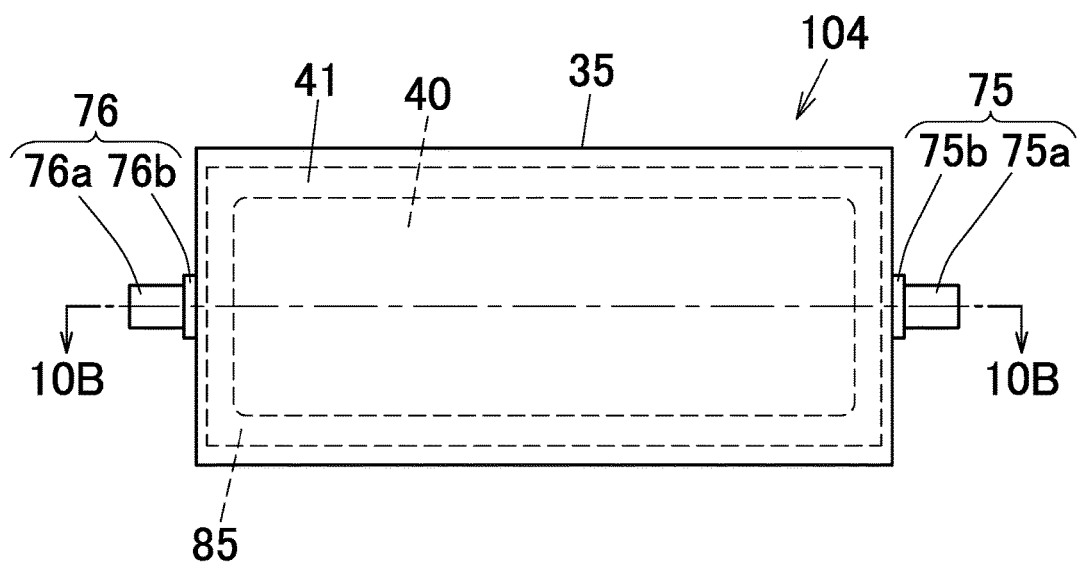
FIG. 10A is a plan view of a laminate-packaged battery of Comparative Example 1 (Related Art).
Figure 10B:
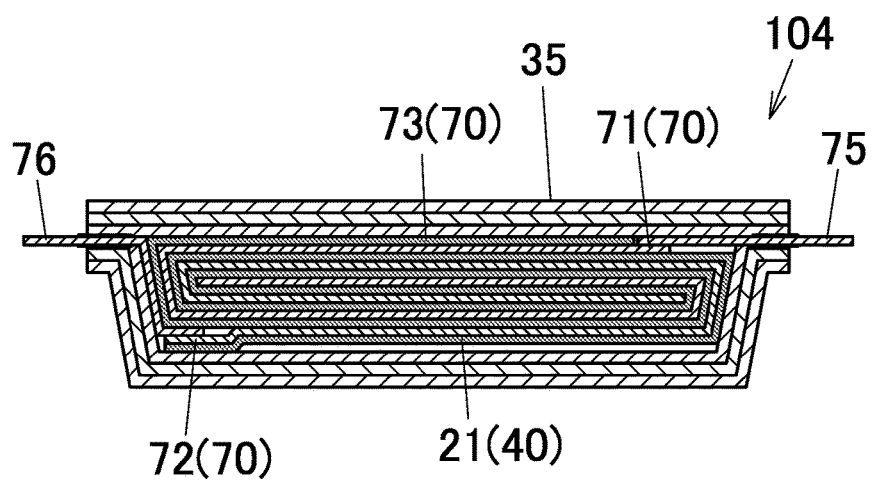
FIG. 10B is a cross-sectional view taken along the line 10B-10B of FIG. 10A (Related Art).

Various simulated batteries were produced. A simulated battery of Example 1 is a laminate-packaged battery in which two pairs of conductive sections are formed on the package 1 shown in FIG. 1 (see FIGS. 7A and 7B). A simulated battery of Example 2 is a laminate-packaged battery in which a pair of conductive sections are formed on the package 3 shown in FIG. 4 (see FIGS. 9A and 9B). A simulated battery of Comparative Example 1 is a laminate-packaged battery that does not have a conductive section in the package as shown in FIGS. 10A and 10B. Further, the packages are common in that they are combinations of a main body in which a concave portion is formed by three-dimensional molding and a cover plate made of a flat sheet.

Furthermore, FIG. 1, FIG. 4, FIG. 7A, FIG. 7B, FIG. 9A, FIG. 9B, FIG. 10A, and FIG. 10B are reference drawings to supplement the explanation of the structure of the battery, and the dimensions of the battery in the drawings and Examples and Comparative Examples do not match.

The materials for the laminated packaging material and the battery main body constituting the package of each Example are common and as follows.

(Laminated Packaging Material)

The materials of each layer of the laminated packaging material for the main body and the cover plate are as shown in Table 1.

TABLE 1

|  | Laminated Packaging Material for Main Body | Laminated Packaging Material for Cover Plate |
| --- | --- | --- |
| Metallic Foil Layer 11 | Soft Aluminum Foil having thickness of 40 μm (A8079H [JIS H4160]) | Soft Stainless Steel Foil having thickness of 40 μm (SUS304) |
| Adhesive Agent 12 | Two-part curing type polyester-urethane-based adhesive agent | |
| Heat-Resistant Resin Layer 13 | Biaxially oriented polyamide film having thickness of 25 μm | Biaxially oriented polyester film having thickness of 25 μm |
| Adhesive Agent 13 | Two-part curing type acid-modified polypropylene-based adhesive agent | |
| Heat-fusible Resin Layer 15 | Unoriented polypropylene Film Having Thickness of 40 μm | |

Further, as the adhesive tapes 80 and 81 for forming the metal exposed section, a polyester adhesive tape having a thickness of 50 μm was used.

(Battery Main Body, Etc.)

For the negative electrode 71, a copper foil having a thickness of 30 μm and cut into 100 mm×100 mm was used. For the positive electrode 72, an aluminum foil having a thickness of 30 μm and cut into 100 mm×100 mm was used. For the separator 73, a polypropylene film having a thickness of 30 μm and width of 100 mm was used.

Figure 11:
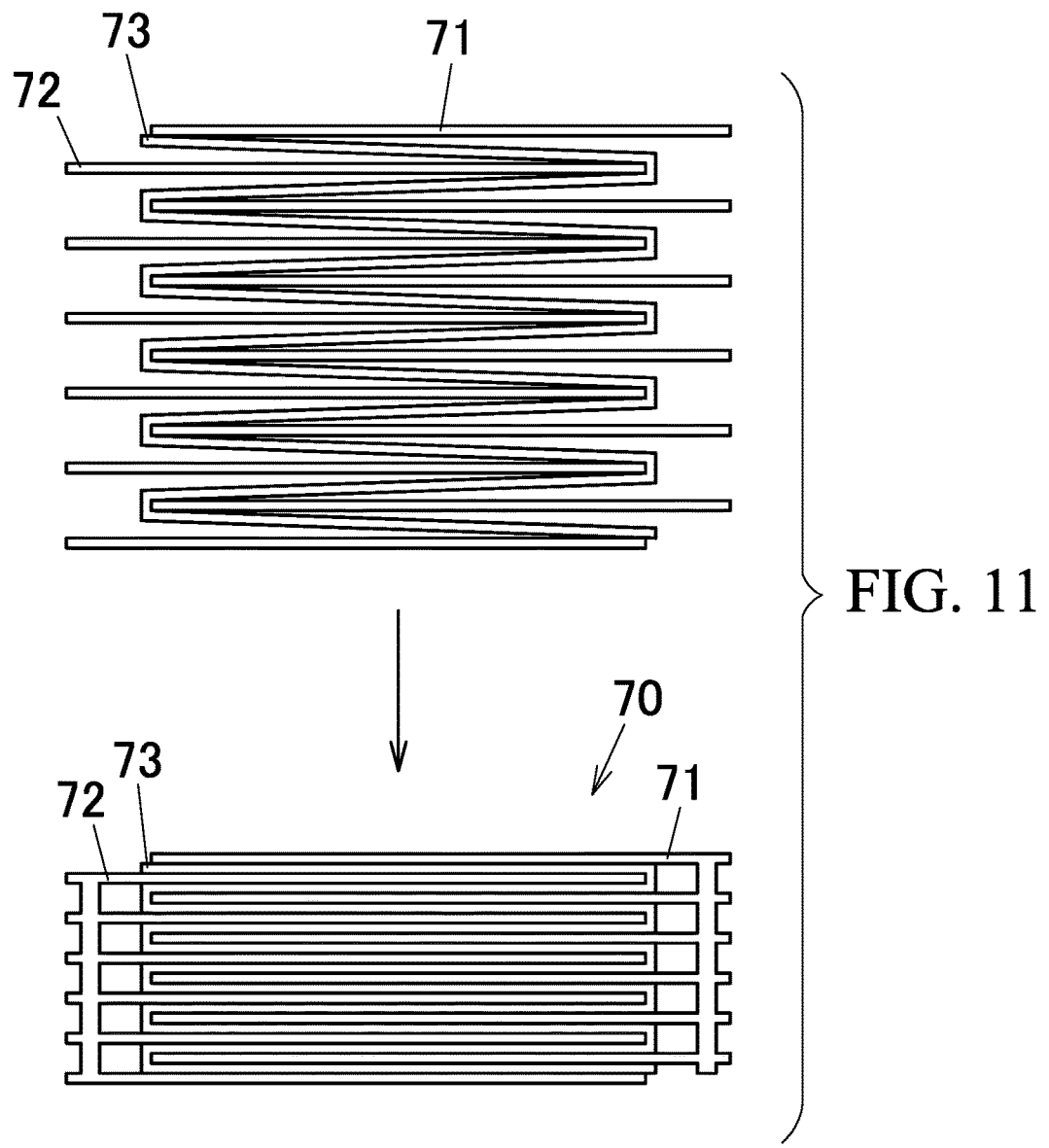
FIG. 11 is an explanatory view of a method of producing a battery main body.

As shown in FIG. 11, the separator 73 was folded zigzag at 90 mm intervals and the negative electrode 71 and the positive electrode 72 were alternately inserted in the valley portion of the zigzag folded separator 73 and forty of each of the negative electrodes 71 and positive electrodes 72 were stacked. Each of the forty negative electrodes 71 and positive electrodes 72 excessively protruded from the separator 73 were connected and fixed by ultrasonic welding to obtain a battery main body (bare cell) 70.

The electrolyte was prepared such that ethylene carbonate, dimethylene carbonate, and dimethyl carbonate were mixed at volume ratio of 1:1:1 and 1 mol of $LiPF_6$ was added per 1 L of the mixed liquid.

The negative electrode tab lead 75 was manufactured by arranging a maleic anhydride-modified polypropylene film (melting point 168° C., Mitsubishi Chemical Corporation Modic™ P502) 75b having a width 15 mm×a length 15 mm×a thickness 0.1 mm on above and below the central portion of the nickel tab 75a having a width 15 mm×a length 100 mm×a thickness 0.1 mm, and by sandwiching and heat-sealing the top and the bottom for 4 seconds using flat hot plates heated to 200° C.

The positive electrode tab lead 76 was manufactured by arranging a maleic anhydride-modified polypropylene film (melting point 168° C., Mitsubishi Chemical Corporation Modic™ P502) 75b having a width 15 mm×a length 15 mm×a thickness 0.1 mm on above and below the central portion of the aluminum plate 75a having a width 15 mm×a length 100 mm×a thickness 0.1 mm, and by sandwiching and heat-sealing the top and the bottom for 4 seconds using flat hot plates heated to 200° C.

Example 1

Example 1 was a laminate-packaged battery 101 as shown in FIG. 7A and FIG. 7B, and as shown in FIG. 1, the package 1 was constituted by the main body 20 and the cover plate 30.

The main body 20 was manufactured using the following method.

On one side of the metallic foil layer 11 (aluminum foil) cut into an A4 size, an adhesive agent 12 in which the concentration was adjusted with a solvent so that the applied amount after drying was 3 g/m² was applied, and after drying for 20 seconds at 100° C., a heat-resistant resin layer 13 was adhered, and it was left for 3 days in an aging furnace at 40° C. to harden the adhesive agent 12.

Figure 12:
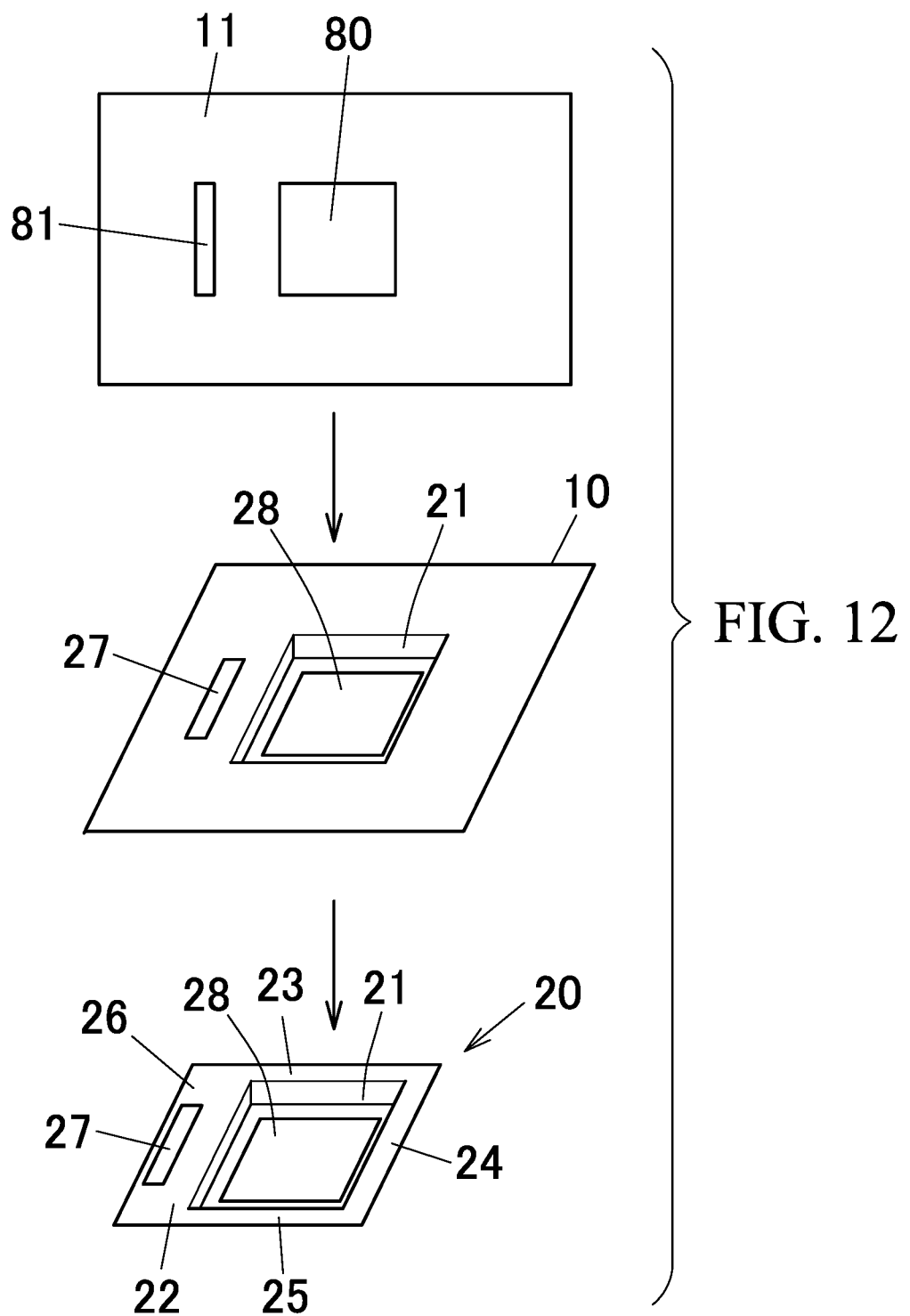
FIG. 12 is a production process diagram of a main body of a package according to Example 1.

As shown in FIG. 12, after leaving it, an adhesive tape 80 of 80 mm×80 mm was adhered at the center of the opposite side of the metallic foil layer 11 (internal conductive section planned position), and an adhesive tape 81 of 80 mm×5 mm was adhered on a position planned for the external conductive section 25 mm apart from the pasting position (top of FIG. 12). Next, on the entire surface of the side on which the adhesive tapes 80 and 81 were taped, an adhesive agent 14 in which the concentration was adjusted with a solvent so that the applied amount after drying was 2 g/m² was applied, and after drying for 20 seconds at 100° C., a thermal fusion resin layer 15 was adhered, and it was left for 3 days in an aging furnace at 40° C. to harden the adhesive agent 14.

After leaving the adhesive agent 14, a cutter knife was used to form a slit in the thermal fusion resin layer 15 in the periphery of the portion in which the adhesive tapes 80 and 81 were adhered, then the thermal fusion resin layer 15 were separated along with the adhesive tapes 80 and 81 to expose the metallic foil layer 11 to form two metal exposed sections 16 (see FIG. 6). The metal exposed section 16 of 80 mm×80 mm became the internal conductive section 28 and the metal exposed section 16 of 80 mm×5 mm became the external conductive section 27.

With that, the laminated packaging material 10 for the main body as shown in FIG. 2 was obtained. The laminated packaging material 10 was a flat sheet, and the internal conductive section 28 and the external conductive section 27 were formed at predetermined positions.

The laminated packaging material 10 was subjected to press forming to 4 mm depth so that the internal conductive section 28 was positioned at the center of the concave portion 21 using a deep drawing mold in which the top face of the male die was 100 mm×100 mm and the corner R (radius of corner) was 2 mm (middle of FIG. 12). The width of the flat portion on a side having the external conductive section 27 was trimmed to 20 mm to form the conductive flange 26 and the width of the other three sides were trimmed to 5 mm to form the flanges 23, 24, and 25. With this, the main body 20 was obtained (bottom of FIG. 12). The planner dimension of the main body 20 was 110 mm×125 mm and the width of the conductive flange 26 was 15 mm.

The cover plate 30 was manufactured using the following method.

Figure 13:
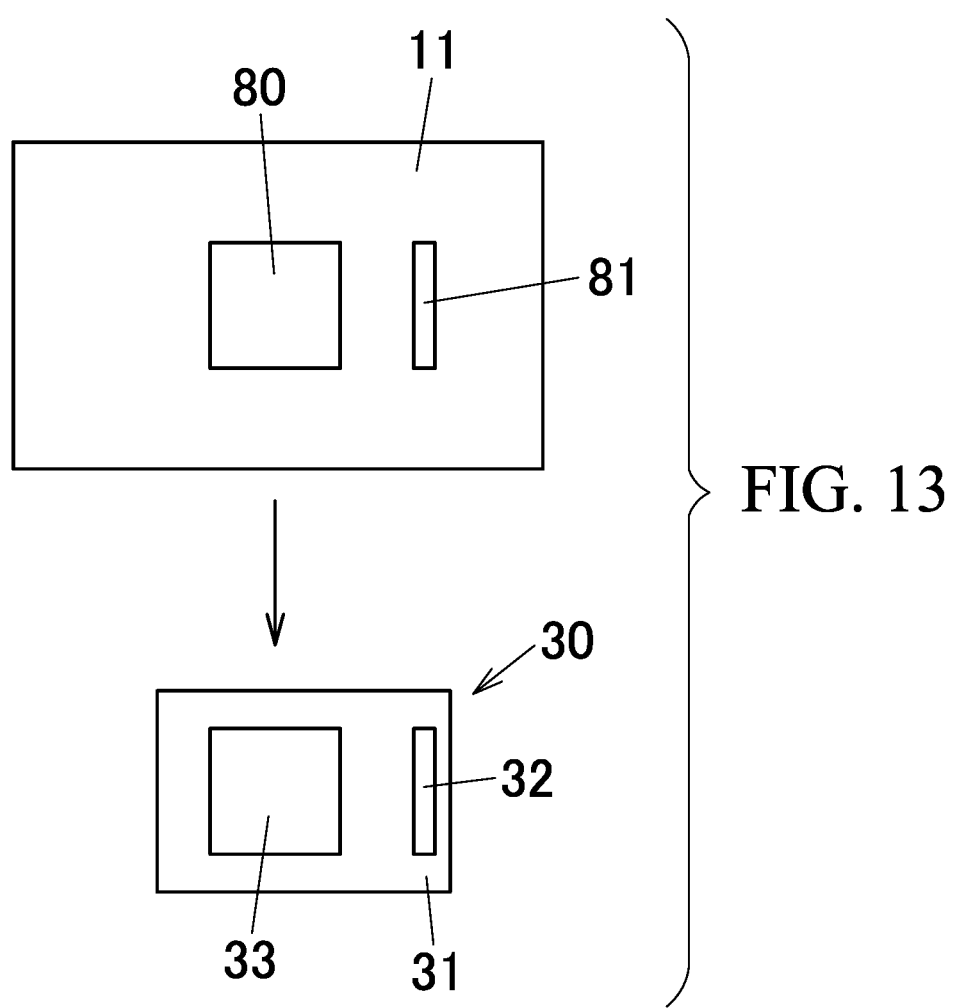
FIG. 13 is a production process diagram of a cover plate of a package according to Example 1.

Except that the metallic foil layer 11 and the heat-resistant resin layer 13 were changed and two adhesive tapes 80 and 81 were adhered 20 mm apart on the metallic foil layer 11 (top of FIG. 13), a flat sheet laminated packaging material 10 was manufactured using the same method as the main body 20. The two metal exposed sections 16 of the laminated packaging material 10 were the internal conductive section 33 and the external conductive section 32. For the laminated packaging material 10 for the cover plate, a margin of 15 mm was left on the internal conductive section 33 side, a margin of 5 mm was left on the external conductive section 32 side, and margins of 5 mm were left on the other two sides and it was trimmed into 110 mm×125 mm to form the cover plate 30 (bottom of FIG. 13). The width 15 mm portion of the external conductive section 32 side of the cover plate 30 became the conductive flange 31.

The battery main body 70 was loaded in the concave portion 21 of the main body 20, then the positive electrode 72 was joined to the internal conductive section 28 via the conductive adhesive agent 74, and the main body 20 was covered with the cover plate 30 so that the conductive flanges 26 and 31 protruded from end portions of each other, and the negative electrode 71 was joined to the internal conductive section 33 of the cover plate 30 via the conductive adhesive agent 74.

A total of 3 sides among 4 sides in the periphery of the assembled storage chamber 40, the two sides having the external conductive sections 27 and 32 and the other one side, were heat-sealed from the cover plate 30 side for 3 seconds using hot plates heated to 200° C. Then, after 10 mL of electrolyte was injected from the non-heat sealed side, the remaining one side was heat-sealed for 3 seconds with hot plates heated to 200° C. under reduced pressure of 750 mmHg to form the laminate-packaged battery 101 shown in FIG. 7A and FIG. 7B. In the laminate-packaged battery 101, the storage chamber 40 was formed by assembling the main body 20 and the cover plate 30, and the positive electrode 72 of the electrode main body 70 loaded in the storage chamber 40 was conducted with the metallic foil layer 11 of the main body 20, so the external conductive section 27 became the positive electrode outside the storage chamber 40, and the negative electrode 71 was conducted with the metallic foil layer 11 of the lid body 30 so the external conductive section 37 became the negative electrode outside the storage chamber 40.

Example 2

FIG. 9A and FIG. 9B show a laminate-packaged battery 103 of Example 2, and the package 3 includes a main body 20 and a cover plate 35 as shown in FIG. 4.

The main body 20 was the same as in Example 1.

The cover plate 35 was produced by the following method.

The laminated packaging material for the cover plate 35 was produced in the same method of the laminated packaging material for the cover plate in Example 1 except that no adhesive tapes 80 and 81 were adhered to the surface of the metallic foil layer 11 on the heat-fusible resin layer 15 side. This laminated packaging material was cut into a piece of 110 mm×110 mm and used as the cover plate 35.

The negative electrode tab lead 75 was fixed to the negative electrode 71 of the battery main body 70 by ultrasonic bonding.

The battery main body 70 was loaded in the concave portion 21 of the main body 20 to connect the positive electrode 72 to the internal conductive section 28 via the conductive adhesive agent 74, and the cover plate 35 was arranged so as to cover the main body 20 so that the conductive flange 26 protruded from the end portion of the cover plate 35 and the negative electrode tab lead 75 was protruded from the flange 24 as an opposed side of the conductive flange 26.

A total of three sides among four sides around the storage chamber 40, i.e., a side having the external conductive section 27, a side from which the negative electrode tab lead was pulled out, and another side, were heat-sealed by heating for three seconds with hot plates heated to 200° C. from the cover plate 35 side. Then, after injecting electrolyte of 10 mL from the non-heat-sealed side, the remaining side was heat-sealed for three seconds with hot plates heated to 200° C. under reduced pressure of 750 mmHg to produce a laminate-packaged battery 103 as shown in FIGS. 9A and 9B. In the laminate-packaged battery 103, by assembling the main body 20 and the cover plate 35, a storage chamber 40 was formed, and the positive electrode 72 of the battery main body 70 loaded in the storage chamber 40 was conducted with the metallic foil layer 11 of the main body 20. As a result, the external conductive section 27 became a positive electrode at the outside of the storage chamber 40, and in the negative electrode 71, the negative electrode tab lead 75 became a negative electrode at the outside of the storage chamber 40.

Comparative Example 1

FIG. 10A and FIG. 10B show a laminate-packaged battery 104 of Comparative Example 1, and the package 4 includes a main body 85 and a cover plate 35.

In the main body 85, the laminated packaging material for a cover plate of Example 2, i.e., a laminated packaging material having no metal exposed section was formed so as to have a concave portion 21 by the same method as in Example 1, and trimmed so as to leave a flange having a width of 5 mm at four sides of the concave portion 21. The planner dimension of the main body 85 was 110 mm×110 mm.

The cover plate 35 was the same as the cover plate of Example 2.

The negative electrode tab lead 75 was fixed to the negative electrode 71 of the battery main body 70 by ultrasonic bonding, and the positive electrode tab lead 76 was fixed to the positive electrode 72 by ultrasonic bonding.

The battery main body 70 was loaded in the concave portion 21 of the main body 20, the negative electrode tab lead 75 and the positive electrode tab lead 76 were pulled out from the opposed two sides of the concave portion 21, and the cover plate 35 were covered.

A total of three sides among four sides around the storage chamber 40 of the assembly, i.e., two sides from which the negative electrode tab lead 75 and the positive electrode tab lead 76 were pulled out and another side, were heat-sealed with hot plates heated to 200° C. for three seconds from the cover plate 35 side. Then, after injecting electrolyte of 10 mL from the non-heat-sealed side, one remaining side was heat-sealed for three seconds with hot plates heated to 200°

C. under reduced pressure of 750 mmHg to thereby produce a laminate-packaged battery 104 as shown in FIGS. 10A and 10B. In the laminate-packaged battery 104, the storage chamber 40 was formed by assembling the main body 20 and the cover plate 35. In the positive electrode 72 and the negative electrode 71 of the battery main body 70 loaded in the storage chamber 40, the positive electrode tab leas 76 and the negative electrode tab lead 75 became electrodes outside the storage chamber 40.

[Evaluation of Laminate-Packaged Battery]

(Lightweighting Rate)

The weights of three types of laminate-packaged batteries produced were measured using an electronic balance (manufactured by Shimadzu Corporation UX820H), and the lightweighing rates of the laminate-packaged batteries of Examples 1 and 2 were obtained by the following equation. In the following equation, "A" denotes a weight of the laminate-packaged battery of Example 1 or Example 2, and "B" denotes a weight of the laminate-packaged battery of Comparative Example.

$$\text{Lightweighting rate}(\%) = [(B-A)/B] \times 100$$

(Insulation Resistance)

About the laminate-packaged battery of each example, the insulation resistance between the positive electrode and the negative electrode exposed outside was measured. The specific measurement positions were between the external conductive section 27 (positive electrode) and the external conductive section 32 (negative electrode) of the package 1 in Example 1, between the external conductive section 27 (positive electrode) and the negative electrode tab lead 75 pulled out of the package 3 in Example 2, and between the positive electrode tab lead 76 and the negative electrode tab lead 75 pulled out of the package 4 in Comparative Example 1. The measurement of the insulation resistance was performed one minute after applying 25 V, 100 V, and 1,000 V using an insulation resistance tester (production No. 3154 made by Hioki E.E. Corporation). In the insulation resistance tester, the measurement limit was 200 MΩ.

Summary and evaluation results of three types of laminate-packaged batteries are shown in Table 2.

TABLE 2

| | Package conductive section | Tab lead | Battery weight (g) | Light-weighting rate (%) | Insulation resistance value | | |
|---|---|---|---|---|---|---|---|
| | | | | | 25 V | 100 V | 1,000 V |
| Ex. 1 | Two pairs | None | 88.56 | 3.28 | >ML | >ML | >ML |
| Ex. 2 | One pair | One | 89.12 | 2.68 | >ML | >ML | >ML |
| Com. Ex. 1 | None | Two | 91.56 | — | >ML | >ML | >ML |

ML: Measurement limit

From Table 2, it was confirmed that the light weighting of the battery could be attained by forming the conductive sections of metal exposed sections in the package. Further, either of the insulating resistance values exceeded 200 MΩ which was the measurement limit, and therefore it was confirmed that the insulation resistant of the laminated packaging material was very high even if the metallic foil layer of the package was used as a conductive member.

The present disclosure can be preferably applied to a power storage device reduced in size and weight.

It should be understood that the terms and expressions used herein are used for explanation and have no intention to be used to construe in a limited manner, do not eliminate any equivalents of features shown and mentioned herein, and allow various modifications falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

The invention claimed is:

1. A package for a power storage device, comprising:
a first laminated packaging material defining a first section and a second laminated packaging material defining a second section,
wherein each of the first and second laminated packaging materials includes:
a metallic foil layer having a first surface and a second surface;
a heat-resistant resin layer adhered to the first surface of the metallic foil layer; and
a heat-fusible resin layer adhered to the second surface of the metallic foil layer,
wherein, the heat-fusible resin layer of the first section and the heat-fusible resin layer of the second section are faced and directly joined with each other without a tab lead interposed therebetween, and edges of the first section and the second section are heat-sealed to define a heat-sealing section and form a storage chamber for accommodating a device main body,
wherein each of the first section and the second section is extended outside the storage chamber to form conductive flanges in which the heat-fusible resin layers are exposed, the conductive flanges are each provided with an external conductive section in which at least a part of the heat-fusible resin layer outward of the heat-sealing section is removed so that the metallic foil layer is exposed and defines the external conductive section, and peripheries of the external conductive sections are surrounded by the heat- fusible resin layers,
wherein the first section is three-dimensionally formed to define a concave portion of the storage chamber, the concave portion defined by each of the metallic foil layer, the heat-resistant resin layer, and the heat-fusible resin layer,
wherein the first laminated packaging material is provided with an internal conductive section in the storage chamber in which a part of the heat-fusible resin layer is removed at a bottom surface so that the metallic foil layer is exposed to conduct with a positive electrode of the device main body,
wherein the second laminated packaging material is provided with an internal conductive section in the storage chamber in which a part of the heat-fusible resin layer is removed so that the metallic foil layer is exposed to conduct with a negative electrode of the device main body, and wherein, in each of the conductive flanges extended from the first section and the second section, the heat-resistant resin layer on a surface of the metallic foil layer opposite to the external conductive section is not removed.

2. The package for a power storage device as recited in claim 1,
wherein the conductive flange of the first laminated packaging material and the conductive flange of the second laminated packaging material are formed on opposite ends of the storage chamber.

3. A power storage device comprising:
the package for a power storage device as recited in claim 1; and
a device main body accommodated in the storage chamber of the package.

4. The power storage device as recited in claim 3,
wherein the positive and negative electrodes of the device main body and the internal conductive sections of the package are conductive by any one of physical contact, adhesion, and ultrasonic welding.

5. A device comprising:
the power storage device as recited in claim 3,
wherein one of the external conductive sections of the power storage device is in direct contact with and connected to a circuit.

6. The package for a power storage device as recited in claim 1,
wherein the heat-fusible resin layer of the first laminated packaging material extends along at least a portion of the bottom surface.

7. The package for a power storage device as recited in claim 6,
wherein the heat-fusible resin layer of the first laminated packaging material is in contact with the positive electrode of the device main body along at least a portion of the bottom surface.

8. The package for a power storage device as recited in claim 1,
wherein the heat-fusible resin layer of the second laminated packaging material extends along at least a portion of a top surface of the storage chamber.

9. The package for a power storage device as recited in claim 8,
wherein the heat-fusible resin layer of the second laminated packaging material is in contact with the negative electrode of the device main body along at least a portion of the top surface of the storage chamber.

* * * * *